(12) United States Patent
Hua et al.

(10) Patent No.: US 10,469,833 B2
(45) Date of Patent: *Nov. 5, 2019

(54) WEARABLE 3D AUGMENTED REALITY DISPLAY WITH VARIABLE FOCUS AND/OR OBJECT RECOGNITION

(71) Applicants: The Arizona Board of Regents on Behalf of the University of Arizona, Tucson, AZ (US); University of Connecticut, Farmington, CT (US)

(72) Inventors: Hong Hua, Tucson, AZ (US); Bahram Javidi, Storrs, CT (US)

(73) Assignees: THE ARIZONA BOARD OF REGENTS ON BEHALF OF THE UNIVERSITY OF ARIZONA, Tucson, AZ (US); THE UNIVERSITY OF CONNECTICUT, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 15/122,497

(22) PCT Filed: Mar. 5, 2015

(86) PCT No.: PCT/US2015/018951
§ 371 (c)(1),
(2) Date: Aug. 30, 2016

(87) PCT Pub. No.: WO2015/134740
PCT Pub. Date: Sep. 11, 2015

(65) Prior Publication Data
US 2017/0102545 A1    Apr. 13, 2017

Related U.S. Application Data

(60) Provisional application No. 61/948,226, filed on Mar. 5, 2014.

(51) Int. Cl.
H04N 13/31    (2018.01)
H04N 13/344   (2018.01)
(Continued)

(52) U.S. Cl.
CPC .......... *H04N 13/31* (2018.05); *G02B 17/086* (2013.01); *G02B 27/0172* (2013.01);
(Continued)

(58) Field of Classification Search
CPC ............ G02B 27/0172; G02B 27/0101; G02B 2027/0118; G02B 2027/0178;
(Continued)

(56) References Cited

U.S. PATENT DOCUMENTS 3,632,184 A    1/1972   King
3,992,084 A    11/1976  Nakamura
(Continued)

FOREIGN PATENT DOCUMENTS

CN    1252133 A      5/2000
CN    101359089 A    2/2009
(Continued)

OTHER PUBLICATIONS

US 9,207,443 B2, 12/2015, Cheng (withdrawn)
(Continued)

*Primary Examiner* — Evan P Dzierzynski
*Assistant Examiner* — Sharrief I Broome
(74) *Attorney, Agent, or Firm* — Neils Haun; Dann, Dorfman, Herrell & Skillman, P.C.

(57) ABSTRACT

A wearable 3D augmented reality display and method, which may include 3D integral imaging optics.

22 Claims, 18 Drawing Sheets

(51) Int. Cl.
*G02B 17/08* (2006.01)
*G02B 27/01* (2006.01)
*G06T 19/00* (2011.01)
*H04N 13/204* (2018.01)
*G06K 9/00* (2006.01)

(52) U.S. Cl.
CPC ........ *G06K 9/00671* (2013.01); *G06T 19/006* (2013.01); *H04N 13/204* (2018.05); *H04N 13/344* (2018.05); *G02B 2027/0127* (2013.01); *G02B 2027/0129* (2013.01); *G02B 2027/0134* (2013.01); *G02B 2027/0185* (2013.01); *H04N 2213/002* (2013.01)

(58) Field of Classification Search
CPC ...... G02B 2027/0123; G02B 2027/011; G02B 2027/013; G02B 27/017; G02B 27/0149; G02B 2027/015; G02B 2027/014; G02B 2027/0138; G02B 27/01; G02B 27/0176; G02B 5/30
See application file for complete search history.

(56) References Cited

U.S. PATENT DOCUMENTS

| | | | |
|---|---|---|---|
| 4,468,101 A | 8/1984 | Ellis | |
| 4,669,810 A | 6/1987 | Wood | |
| 4,753,522 A | 6/1988 | Nishina | |
| 4,863,251 A | 9/1989 | Herloski | |
| 5,109,469 A | 4/1992 | Duggan | |
| 5,172,272 A | 12/1992 | Aoki | |
| 5,172,275 A | 12/1992 | DeJager | |
| 5,416,315 A | 5/1995 | Filipovich | |
| 5,436,763 A | 7/1995 | Chen | |
| 5,526,183 A | 6/1996 | Chen | |
| 5,577,729 A | 11/1996 | Fisher | |
| 5,621,572 A | 4/1997 | Fergason | |
| 5,625,495 A | 4/1997 | Moskovich | |
| 5,699,194 A | 12/1997 | Takahashi | |
| 5,701,202 A | 12/1997 | Takahashi | |
| 5,706,136 A | 1/1998 | Okuyama | |
| 5,818,632 A | 10/1998 | Stephenson | |
| 5,880,711 A | 3/1999 | Tamada | |
| 5,917,656 A | 6/1999 | Hayakawa | |
| 5,959,780 A | 9/1999 | Togino | |
| 6,008,781 A | 12/1999 | Furness | |
| 6,023,373 A | 2/2000 | Inoguchi | |
| 6,028,606 A | 2/2000 | Kolb | |
| 6,034,823 A | 3/2000 | Togino | |
| 6,198,577 B1 | 3/2001 | Kedar | |
| 6,201,646 B1 | 3/2001 | Togino | |
| 6,236,521 B1 | 5/2001 | Nanba | |
| 6,239,915 B1 | 5/2001 | Takagi | |
| 6,243,199 B1 | 6/2001 | Hansen | |
| 6,271,972 B1 | 8/2001 | Kedar | |
| 6,384,983 B1 | 5/2002 | Yamazaki | |
| 6,396,639 B1 | 5/2002 | Togino | |
| 6,404,561 B1 | 6/2002 | Isono | |
| 6,404,562 B1 | 6/2002 | Ota | |
| 6,433,376 B2 | 8/2002 | Kim | |
| 6,433,760 B1 | 8/2002 | Vaissie | |
| 6,493,146 B2 | 12/2002 | Inoguchi | |
| 6,510,006 B1 | 1/2003 | Togino | |
| 6,563,648 B2 | 5/2003 | Gleckman | |
| 6,646,811 B2 | 11/2003 | Inoguchi | |
| 6,653,989 B2 | 11/2003 | Nakanishi | |
| 6,671,099 B2 | 12/2003 | Nagata | |
| 6,731,434 B1 | 5/2004 | Hua | |
| 6,829,113 B2 | 12/2004 | Togino | |
| 6,963,454 B1 | 11/2005 | Martins | |
| 6,999,239 B1 | 2/2006 | Martins | |
| 7,152,977 B2 | 12/2006 | Ruda | |
| 7,177,083 B2 | 2/2007 | Holler | |
| 7,230,583 B2 | 6/2007 | Tidwell | |
| 7,249,853 B2 | 7/2007 | Weller-Brophy | |
| 7,405,881 B2 | 7/2008 | Shimizu | |
| 7,414,791 B2 | 8/2008 | Urakawa | |
| 7,522,344 B1 | 4/2009 | Curatu | |
| 8,467,133 B2 | 6/2013 | Miller | |
| 8,503,087 B1 | 8/2013 | Amirparviz | |
| 8,511,827 B2 | 8/2013 | Hua | |
| 9,239,453 B2 | 1/2016 | Cheng | |
| 9,310,591 B2 | 4/2016 | Hua | |
| 9,720,232 B2 | 8/2017 | Hua | |
| 9,874,760 B2 | 1/2018 | Hua | |
| 2001/0009478 A1 | 7/2001 | Yamazaki | |
| 2002/0015116 A1 | 2/2002 | Park | |
| 2002/0060850 A1* | 5/2002 | Takeyama | G02B 27/0172 359/630 |
| 2002/0063913 A1 | 5/2002 | Nakamura | |
| 2003/0076591 A1 | 4/2003 | Ohmori | |
| 2003/0090753 A1 | 5/2003 | Takeyama | |
| 2004/0136097 A1 | 7/2004 | Park | |
| 2004/0164927 A1 | 8/2004 | Suyama | |
| 2004/0196213 A1 | 10/2004 | Tidwell | |
| 2004/0218243 A1 | 11/2004 | Yamazaki | |
| 2004/0233551 A1 | 11/2004 | Takahashi | |
| 2005/0036119 A1 | 2/2005 | Ruda | |
| 2005/0179868 A1 | 8/2005 | Seo | |
| 2005/0248849 A1 | 11/2005 | Urey | |
| 2006/0028400 A1* | 2/2006 | Lapstun | G02B 26/06 345/8 |
| 2006/0119951 A1 | 6/2006 | McGuire | |
| 2007/0109505 A1 | 5/2007 | Kubara | |
| 2007/0246641 A1 | 10/2007 | Baun | |
| 2008/0036853 A1 | 2/2008 | Shestak | |
| 2008/0094720 A1 | 4/2008 | Yamazaki | |
| 2008/0291531 A1 | 11/2008 | Heimer | |
| 2009/0115842 A1 | 5/2009 | Saito | |
| 2009/0168010 A1 | 7/2009 | Vinogradov | |
| 2010/0091027 A1 | 4/2010 | Oyama | |
| 2010/0109977 A1 | 5/2010 | Yamazaki | |
| 2010/0208372 A1 | 8/2010 | Heimer | |
| 2010/0271698 A1 | 10/2010 | Kessler | |
| 2010/0289970 A1* | 11/2010 | Watanabe | G02B 15/00 348/745 |
| 2011/0037951 A1 | 2/2011 | Hua | |
| 2011/0043644 A1 | 2/2011 | Munger | |
| 2011/0075257 A1 | 3/2011 | Hua | |
| 2011/0090389 A1 | 4/2011 | Saito | |
| 2011/0221656 A1 | 9/2011 | Haddick | |
| 2012/0013988 A1* | 1/2012 | Hutchin | G02B 27/0172 359/631 |
| 2012/0019557 A1 | 1/2012 | Aronsson | |
| 2012/0050891 A1 | 3/2012 | Seidl | |
| 2012/0057129 A1 | 3/2012 | Durnell | |
| 2012/0081800 A1 | 4/2012 | Cheng | |
| 2012/0113092 A1* | 5/2012 | Bar-Zeev | G02B 27/017 345/419 |
| 2012/0160302 A1 | 6/2012 | Citron | |
| 2012/0162549 A1 | 6/2012 | Gao | |
| 2012/0242697 A1 | 9/2012 | Border | |
| 2013/0100524 A1 | 4/2013 | Magarill | |
| 2013/0112705 A1 | 5/2013 | McGill | |
| 2013/0187836 A1 | 7/2013 | Cheng | |
| 2013/0222896 A1 | 8/2013 | Komatsu | |
| 2013/0258461 A1 | 10/2013 | Sato | |
| 2013/0285885 A1 | 10/2013 | Nowatzyk | |
| 2013/0286053 A1 | 10/2013 | Fleck | |
| 2013/0300634 A1 | 11/2013 | White | |
| 2013/0329304 A1 | 12/2013 | Hua | |
| 2014/0009845 A1 | 1/2014 | Cheng | |
| 2014/0300869 A1 | 10/2014 | Hirsch | |
| 2014/0361957 A1 | 12/2014 | Hua | |
| 2015/0168802 A1 | 6/2015 | Bohn | |
| 2015/0201176 A1 | 7/2015 | Graziosi | |
| 2015/0208061 A1 | 7/2015 | Yang | |
| 2015/0212321 A1 | 7/2015 | Zhao | |
| 2015/0262424 A1* | 9/2015 | Tabaka | G02B 27/0075 345/633 |
| 2015/0277129 A1 | 10/2015 | Hua | |
| 2015/0363978 A1 | 12/2015 | Maimone | |
| 2016/0085075 A1 | 3/2016 | Cheng | |

(56) References Cited

U.S. PATENT DOCUMENTS

| | | |
|---|---|---|
| 2016/0239985 A1 | 8/2016 | Haddick et al. |
| 2016/0320620 A1 | 11/2016 | Maimone |
| 2017/0078652 A1 | 3/2017 | Hua |
| 2017/0102545 A1 | 4/2017 | Hua |
| 2017/0202633 A1 | 7/2017 | Liu |
| 2018/0045949 A1 | 2/2018 | Hua |

FOREIGN PATENT DOCUMENTS

| | | |
|---|---|---|
| CN | 101424788 A | 5/2009 |
| EP | 0408344 | 1/1991 |
| EP | 1102105 | 5/2001 |
| JP | 08160345 | 6/1996 |
| JP | H09218375 A | 8/1997 |
| JP | H09297282 | 11/1997 |
| JP | H1013861 | 1/1998 |
| JP | H10307263 | 11/1998 |
| JP | H11326820 A | 11/1999 |
| JP | 2001013446 | 1/2001 |
| JP | 2001066543 A | 3/2001 |
| JP | 2001145127 | 5/2001 |
| JP | 2001238229 | 8/2001 |
| JP | 2002148559 | 5/2002 |
| JP | 2003241100 | 8/2003 |
| JP | 2006276884 A | 10/2006 |
| JP | 2007101930 | 4/2007 |
| JP | 2014505381 | 2/2014 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2012064546 | 5/2012 |
| WO | 2012118573 | 9/2012 |
| WO | 2013112705 | 8/2013 |
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |

OTHER PUBLICATIONS

US 9,213,186 B2, 12/2015, Cheng (withdrawn)
US 9,880,387 B2, 01/2018, Hua (withdrawn)
S. Feiner, 2002, "Augmented reality: A new way of seeing," Scientific American, No. 54, 2002.
K. Ukai and P.A. Howardth, "Visual fatigue caused by viewing stereoscopic motion images: background, theories, and observations," Displays, 29(2), pp. 106-116, 2008.
B. T. Schowengerdt, M. Murari, E. J. Seibel, "Volumetric display using scanned fiber array," SID Symposium Digest of Technical Papers, 2010.
H. Hua and B. Javidi, "A 3D integral imaging optical see-through head-mounted display", Optics Express, 22(11): 13484-13491, 2014.
W. Song, Y. Wang. D. Cheng, Y. Liu, "Light field head-mounted display with correct focus cue using micro structure array," Chinese Optics Letters, 12(6): 060010, 2014.
T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.
Hu, X., Development of the Depth-Fused Multi-Focal Plane Display Technology, Ph.D. Dissertation, College of Optical Sciences, University of Arizona, 2014.
S. Ravikumar, K. Akeley, and M. S. Banks, "Creating effective focus cues in multi-plane 3D displays," Opt. Express 19, 20940-20952, 2011.

X. Hu and H. Hua, "Design and tolerance of a free-form optical system for an optical see-hrough multi-focal-plane display," Applied Optics, 54(33): 9990-9, 2015.
Armitage, David, Ian Underwood, and Shin-Tson Wu. Introduction to Microdisplays. Chichester, England: Wiley, 2006.
Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).
C. B. Burckhardt, "Optimum parameters and resolution limitation of integral photography," J. Opt. Soc. Am. 58, 71-76 (1968).
C. Manh Do, R. Martinez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Christopher M. Bishop, Neural Networks for Pattern Recognition, Oxford University Press, Inc. New York, NY 1995.
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Duchowski, A., "Eyetracking Methodology: theory and practice," Publisher: Springer, 2003.
Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).
Edgar et al., "Visual Accommodation Problems with Head-Up and Helmet-Mounted Displays?," Displays 15:68-75 (1994).
European Search Report dated Aug. 14, 2015 in corresponding EP application 13740989.2.
F. Okano, H. Hoshino, J. Arai y I. Yuyama, "Real-time pickup method for a three-dimensional image based on integral photography," Appl. Opt. 36, 1598-1603 (1997).
Favalora et al., "100 Million-Voxel Volumetric Display," Proc. SPIE 4712:300-312 (2002).
G. Lippmann, "Epreuves reversibles donnant la sensation du relief," Journal of Physics (Paris) 7, 821-825 (1908).
G. Wetzstein et al., "Tensor Displays: Compressive light field synthesis using multilayer displays with directional backlighting," ACM Transactions on Graphics, 31(4), 2012.
GB Examination Report corresponding to GB 1012165.5 dated Jun. 28, 2011.
Geisler, W.S., J.S. Perry and J. Najemnik, "Visual search: The role of peripheral information measured using gaze-contingent displays," J. Vision 6, 858-873 (2006).
Graham-Rowe, "Liquid Lenses Make a Splash," Nature-Photonics pp. 2-4 (2006).
H. Hua, X. Hu, and C. Gao, "A high-resolution optical see-through head-mounted display with eyetracking capability," Optics Express, Nov. 2013.

(56) References Cited

OTHER PUBLICATIONS

H. Hua, "Sunglass-like displays become a reality with freeform optical technology," SPIE Newsroom, 2012.
H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
H. Hoshi, N. Taniguchi, H. Morishima, T. Akiyama, S. Yamazaki and A. Okuyama, "Off-axial HMD optical system consisting of aspherical surfaces without rotational symmetry," SPIE vol. 2653, 234 (1996).
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Heanue et al., "Volume Holographic Storage and Retrieval of Digital Data," Science 265:749-752 (1994).
Hidenori Kuriyabashi, Munekazu Date, Shiro Suyama, Toyohiko HatadaJ. of the SID 14/5, 2006 pp. 493-498.
Hua, "Merging the Worlds of Atoms and Bits: Augmented Virtual Environments," Optics and Photonics News 17:26-33 (2006).
Hua, H., C. Pansing, and J. P. Rolland, "Modeling of an eye-imaging system for optimizing illumination schemes in an eye-tracked head-mounted display," Applied Optics, 46(32): 1-14, Nov. 2007.
Hua, H. "Integration of eye tracking capability into optical see-through head-mounted displays," Proceedings of SPIE (Electronic Imaging 2001), pp. 496-503, Jan. 2001.
Hua et al, "Compact eyetracked optical see-through head-mounted display", Proc. SPIE 8288, Stereoscopic Displays and Applications XXIII, 82881F (Feb. 9, 2012).
Inoue et al., "Accommodative Responses to Stereoscopic Three-Dimensional Display," Applied Optics, 36:4509-4515 (1997).
International Search Report and Written Opinion dated Nov. 24, 2015 in corresponding PCT application PCT/US2015/047163.
International Search Report dated Feb. 10, 2011 from PCT/CN2010/072376.
International Search Report dated Jan. 29, 2014 in corresponding international application PCT/US2013/065422.
International Search Report dated Jun. 18, 2010 in corresponding international application PCT/US2010/031799.
J. Hong, S. Min, and B. Lee, "Integral floating display systems for augmented reality," Applixed Optics, 51(18):4201-9, 2012.
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
J. Arai, et al., "Depth-control method for integral imaging," Feb. 1, 2008 / vol. 33, No. 3 / Optics Letters.
J. E. Melzer's: 'Overcoming the field-of-view/resolution invariant in head-mounted displays' Proc. SPIE vol. 3362, 1998, p. 284.
J. G. Droessler, D. J. Rotier, "Tilted cat helmet-mounted display," Opt. Eng., vol. 29, 849 (1990).
J. P. Rolland, "Wide-angle, off-axis, see-through head-mounted display," Opt. Eng., vol. 39, 1760 (2000).
J. S. Jang, F. Jin, and B. Javidi, "Three-dimensional integral imaging with large depth of focus by use of real and virtual image fields," Opt. Lett. 28:1421-23, 2003.
J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
Jisoo Hong, et al., "Three-dimensional display technologies of recent interest: Principles, Status, and Issues," Applied Optics (Dec. 1, 2011) 50(34):106.
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No. 94CH3571-5). IEEE. Part vol. 1, 1994, pp. 13-18 vol. 1. New York, NY, USA.
Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
L. G. Brown's: 'Applications of the Sensics panoramic HMD' SID Symposium Digest vol. 39, 2008, p. 77.
Laurence R. Young, David Sheena, "Survey of eye movement recording methods", Behavior Research Methods & Instrumentation, 7(5), 397-429, 1975.
Liu et al., 'A Novel Prototype for an Optical See-Through Head-Mounted Display with Addressable Focus Cues,' IEEE Transactions on Visualization and Computer Graphics 16:381-393 (2010).
Liu et al., "A Systematic Method for Designing Depth-Fused Multi-Focal Plane Three-Dimensional Displays," Optics Express 18:11562-11573 (2010).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Loschky, L.C. and Wolverton, G.S., "How late can you update gaze-contingent multiresolutional displays without detection?" ACM Trans. Mult. Comp. Comm. and App. 3, Nov. 2007.
Love et al. (High Speed switchable lens enables the development of a volumetric stereoscopic display. Aug. 2009, Optics Express. vol. 17, No. 18, pp. 15716-15725.).
M. Marti?nez-Corral, H. Navarro, R. Martínez-Cuenca, G. Saavedra, and B. Javidi, "Full parallax 3-D TV with programmable display parameters," Opt. Phot. News 22, 50-50 (2011).
M. D. Missig and G. M. Morris, "Diffractive optics applied to eyepiece design," Appl. Opt. 34, 2452-2461 (1995).
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
M. Gutin: 'Automated design and fabrication of ocular optics' Proc. SPIE 2008, p. 7060.
M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
M. Lucente, "Interactive three-dimensional holographic displays: seeing the future in depth," Computer Graphics, 31(2), pp. 63-67, 1997.
McQuaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
O. Cakmakci, B. Moore, H. Foroosh, and J. P. Rolland, "Optimal local shape description for rotationally non-symmetric optical surface design and analysis," Opt. Express 16, 1583-1589 (2008).
Optical Research Associates, http://www.opticalres.com, 2 pages (obtained Jan. 26, 2011).
P. A. Blanche, et al, "Holographic three-dimensional telepresence using large-area photorefractive polymer", Nature, 468, 80-83, Nov. 2010.
P. Gabbur, H. Hua, and K. Barnard, 'A fast connected components labeling algorithm for real-time pupil detection,' Mach. Vision Appl., 21(5):779-787, 2010.
R. Martínez-Cuenca, H. Navarro, G. Saavedra, B. Javidi, and M. Martínez-Corral, "Enhanced viewing-angle integral imaging by multiple-axis telecentric relay system," Optics Express, vol. 15, Issue 24, pp. 16255-16260, Nov. 21, 2007.

(56) References Cited

OTHER PUBLICATIONS

R. Schulein, C. Do, and B. Javidi, "Distortion-tolerant 3D recognition of underwater objects using neural networks," Journal of Optical Society of America A, vol. 27, No. 3, pp. 461-468, Mar. 2010.
R. Schulein, M. DaneshPanah, and B. Javidi, "3D imaging with axially distributed sensing," Journal of Optics Letters, vol. 34, Issue 13, pp. 2012-2014, Jul. 1, 2009.
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Rolland et al., "Multifocal Planes Head-Mounted Displays," Applied Optics 39:3209-3215 (2000).
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.
S. Hong and B. Javidi, "Distortion-tolerant 3D recognition of occluded objects using computational integral imaging," Journal of Optics Express, vol. 14, Issue 25, pp. 12085-12095, Dec. 11, 2006.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
Schowengerdt, B. T., and Seibel, E. J., "True 3-D scanned voxel displays using single or multiple light sources," Journal of SID, 14(2), pp. 135-143, 2006.
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
T. Okoshi, "Optimum design and depth resolution of lens-sheet and projection-type three-dimensional displays," Appl. Opt. 10, 2284-2291 (1971).
T. Ando, K. Yamasaki, M. Okamoto, and E. Shimizu, "Head Mounted Display using holographic optical element," Proc. SPIE, vol. 3293, 183 (1998).
Tibor Balogh, "The HoloVizio System," Proceedings of SPIE, vol. 6055, 2006.
Varioptic, "Video Auto Focus and Optical Image Stabilization," http://vvww.varioptic.com/en/home.html, 2 pages (2008).
Wann et al., Natural Problems for Stereoscopic Depth Perception in Virtual Environments, Vision Res. 35:2731-2736 (1995).
Wartenberg, Philipp, "EyeCatcher, the Bi-directional OLED Microdisplay," Proc. of SID 2011.
Watt et al., "Focus Cues Affect Perceived Depth," J Vision 5:834-862 (2005).
Written Opinion dated Feb. 10, 2011 from PCT/CN2010/072376.
Written Opinion dated Jun. 18, 2010 in corresponding international application PCT/US2010/031799.
X. Hu and H. Hua, "Design and assessment of a depth-fused multi-focal-plane display prototype," Journal of Display Technology, Dec. 2013.
Xiao Xiao, Bahram Javidi, Manuel Martinez-Corral, and Adrian Stern , "Advances in Three-Dimensional Integral Imaging: Sensing, Display, and Applications," Applied Optics, 52(4):. 546-560,2013.
Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).
Xinda Hu and Hong Hua, "High-resolution optical see-through multi-focal-plane head-mounted display using freeform optics," Optics Express,22(11): 13896-13903, Jun. 2014.
Y. Takaki, Y. Urano, S. Kashiwada, H. Ando, and K. Nakamura, "Super multi-view winshield display for long-distance image information presentation," Opt. Express, 19, 704-16, 2011.
Yamazaki et al, "Thin wide-field-of-view HMD with free-form-surface prism and applications", Proc. SPIE 3639, Stereoscopic Displays and Virtual Reality Systems VI, 453 (May 24, 1999).
Yano, S., Emoto, M., Mitsuhashi, T., and Thwaites, H., "A study of visual fatigue and visual comfort for 3D HDTV/HDTV images," Displays, 23(4), pp. 191-201, 2002.
European Search Report dated Apr. 28, 2016 from EP application 13847218.8.
Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.
Hu and Hua, ?Design and tolerance of a freeform optical system for an optical see-through multi-focal plane display,? Applied Optics, 2015.
A. Yabe, ?Representation of freeform surface suitable for optimization,? Applied Optics, 2012.
Dewen Cheng et al.; "Large field-of-view and high resolution free-form head-mounted display"; SPIE-OSA/ vol. 7652 Jun. 2018.
Huang et al., "An integral-imaging-based head-mounted light field display using a tunable lens ,;1nd aperture array." Journal of the Society for Information Display Mar. 1, 2017; p. 199-201.
Office Action in U.S. Appl. No. 15/122,492 dated Sep. 5, 2018.
Response dated Sep. 5, 2018 Office Action filed Dec. 5, 2018.in U.S. Appl. No. 15/122,492.
Notice of Allowance in U.S. Appl. No. 15/122,492 dated Jan. 25, 2019.
Fresnel Lenses' downloaded from http://www.fresneltech.com on Jun. 8, 2011. Copyright Fresnel Technologies, Inc., 2003.
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM SIGGRAPH (ACM, Chicago, 1992), pp. 203-210.
Biocca, et al., "Virtual eyes can rearrange your body: adapting to visual displacement in see-through, head-mounted displays", Presence: Teleoperators and Virtual Environments 7, 262-277 (1998).
Bunkenburg, J. 'Innovative Diffractive Eyepiece for Helmet-Mounted Display.' SPIE vol. 3430. pp. 41-49 Jul. 1998.
C. Curatu, H. Hua, and J. P. Rolland, "Projection-based headmounted display with eye-tracking capabilities," Proc. SPIE 5875, 587050J (2005).
Cakmakci, O., et al., 'Head-Worn Displays: A Review'. Journal of Display Technology, vol. 2, No. 3, Sep. 2006, pp. 199-216.
Caudell, T., et al., "Augmented reality: an application of heads-up display technology to manual manufacturing processes" in Proceedings of Hawaii International Conferences on Systems Sciences (Hawaii, 1992), pp. 659-669.
Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM SIGGRAPH, ACM Press (1993).

(56) References Cited

OTHER PUBLICATIONS

Examination Report dated Apr. 29, 2011 from corresponding GB Application No. GB1012165.5.
H. Hua, C. Gao, and J. P. Rolland, 'Study of the Imaging properties of retroreflective materials used in head-mounted projective displays (HMPDs),' Proc. SPIE4711, 194-201 (2002).
H. Hua, C. Gao, F. Biocca, and J. P. Rolland, "An ultra-light and compact design and implementation of head-mounted projective displays," in Proceedings of IEEE VR 2001, pp. 175-182.
H. Hua, L. Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al., 'Design of a Bright Polarized Head-Mounted Projection Display' Applied Optics 46:2600-2610 (2007).
International Search Report dated Mar. 9, 2009 with regard to International Patent Application No. PCT/US2009/031606.
J. L. Pezzaniti and R. A. Chipman, "Angular dependence of polarizing beam-splitter cubes," Appl. Opt. 33, 1916-1929 (1994).
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion of the International Searching Authority dated Mar. 9, 2009 with regard to International Patent Application No. PCT/US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
Zhang, R., et al., "Design of a Polarized Head-Mounted Projection Display using FLCOS Microdisplays", Proc. of SPIE vol. 6489, 64890B-1. (2007).
"OLED-XL Microdisplays," eMagin 5 pages (2010).
A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.
A. Malmone, and H. Fuchs, "Computational augmented reality eyeglasses," Proc. of ISMAR 2012.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).
A. T. Duchowski, "Incorporating the viewer's Point-Of-Regard (POR) in gaze-contingent virtual environments", SPIE-Int. Soc. Opt. Eng. Proceedings of SPIE—the International Society for Optical Engineering, vol. 3295, 1998, pp. 332-343.
Akeley et al., "A Stereo Display Prototype with Multiple Focal Distances," ACM Trans. Graphics 23:804-813 (2004).
Blundell, B. G., and Schwarz, A. J., "The classification of volumetric display systems: characteristics and predictability of the image space," IEEE Transaction on Visualization and Computer Graphics, 8(1), pp. 66-75, 2002.
Full Certified Translation of Reference JP008160345.

* cited by examiner

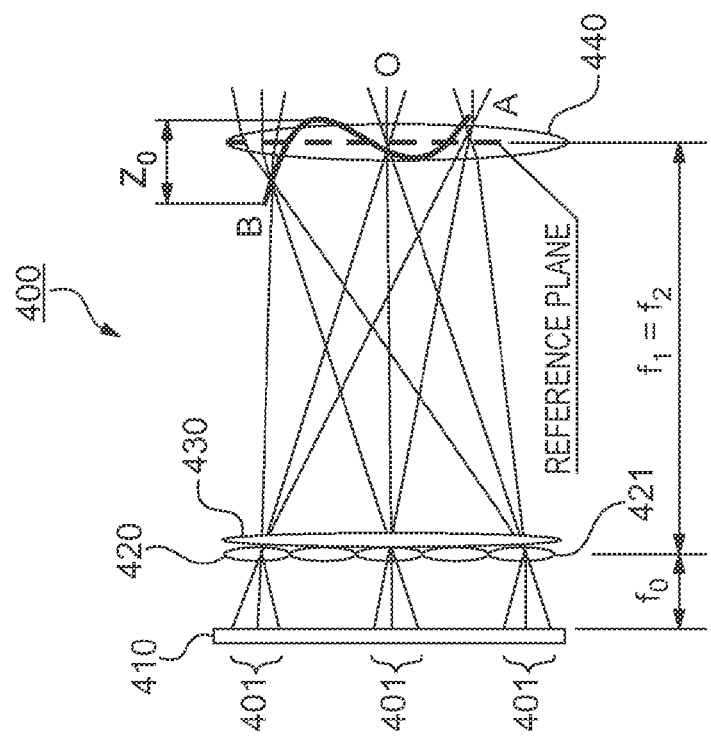
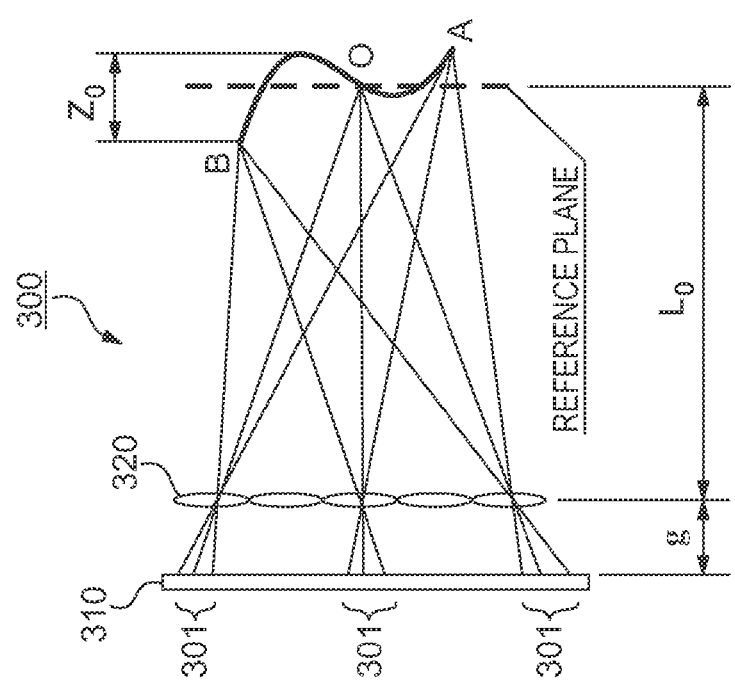

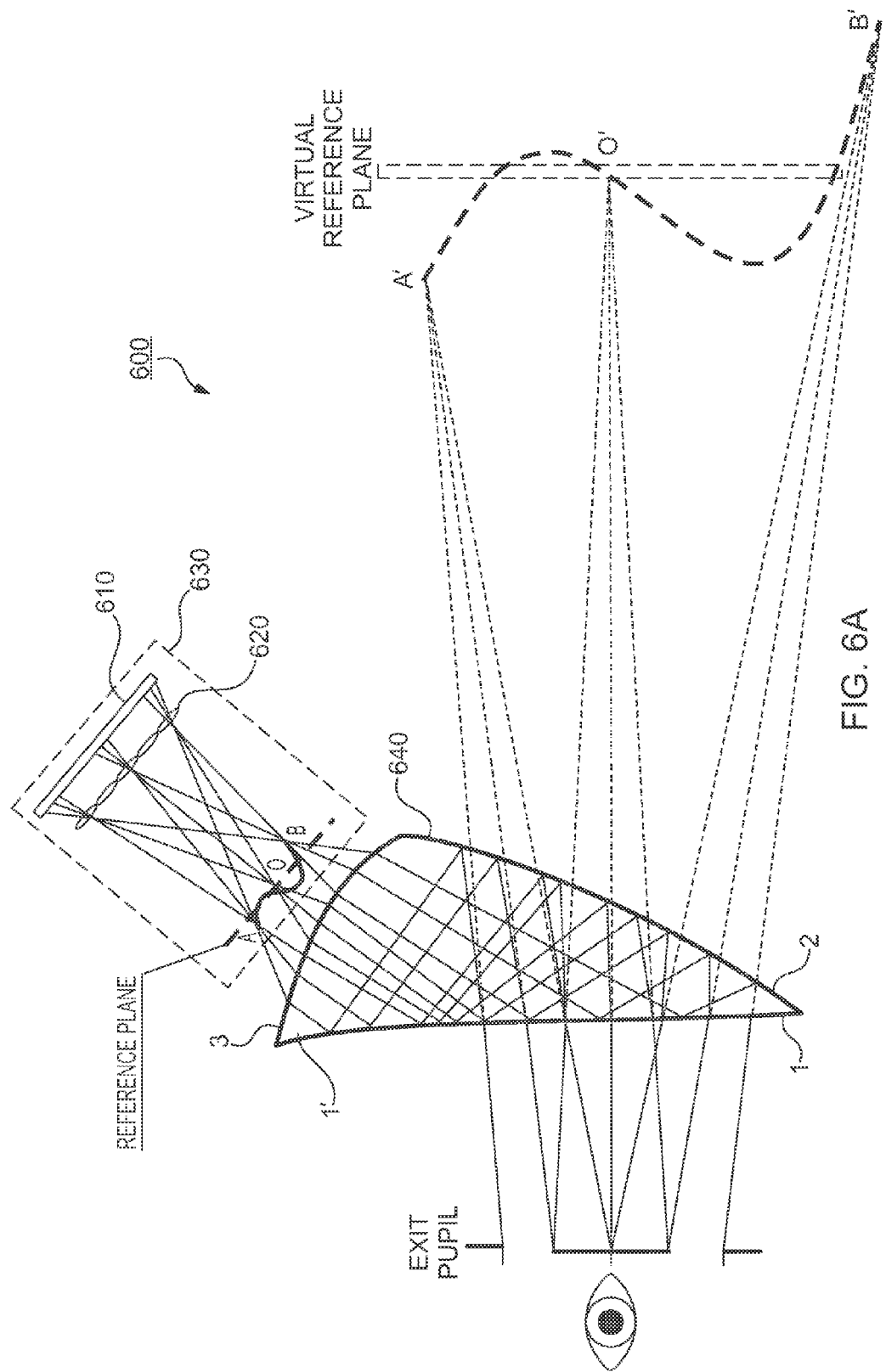

WEARABLE 3D AUGMENTED REALITY DISPLAY WITH VARIABLE FOCUS AND/OR OBJECT RECOGNITION

RELATED APPLICATIONS

This application is a 371 application of International Application No. PCT/US15/18951 filed Mar. 5, 2015, which claims the benefit of priority of U.S. Provisional Application No. 61/948,226 filed on Mar. 5, 2014, the entire contents of which application(s) are incorporated herein by reference.

GOVERNMENT LICENSE RIGHTS

This invention was made with government support under Grant Nos. 1422653 and 1422179, awarded by NSF. The government has certain rights in the invention.

FIELD OF THE INVENTION

The present invention relates generally to a wearable 3D augmented reality display, and more particularly, but not exclusively, to a wearable 3D augmented reality display comprising 3D integral imaging (InI) optics with optional variable focus and/or object recognition.

BACKGROUND OF THE INVENTION

An augmented reality (AR) display, which allows overlaying 2D or 3D digital information on a person's real-world view, has long been portrayed as a transformative technology to redefine the way we perceive and interact with digital information. Although several types of AR display devices have been explored, a desired form of AR displays is a lightweight optical see-through head-mounted display (OST-HMD), which enables optical superposition of digital information onto the direct view of the physical world and maintains see-through vision to the real world. With the rapidly increased bandwidth of wireless networks, the miniaturization of electronics, and the prevailing cloud computing, one of the current challenges is to realize an unobtrusive AR display that integrates the functions of OST-HMDs, smart phones, and mobile computing within the volume of a pair of eyeglasses.

Such an AR display, if available, will have the potential to revolutionize many fields of practice and penetrate through the fabric of life, including medical, defense and security, manufacturing, transportation, education and entertainment fields. For example, in medicine AR technology may enable a physician to see CT images of a patient superimposed onto the patient's abdomen while performing surgery; in mobile computing it can allow a tourist to access reviews of restaurants in his or her sight while walking on the street; in military training it can allow fighters to be effectively trained in environments that blend 3D virtual objects into live training environments.

Typically, the most critical barriers of AR technology are defined by the displays. The lack of high-performance, compact and low-cost AR displays limits the ability to explore the full range of benefits potentially offered by AR technology. In recent years a significant research and market drive has been toward overcoming the cumbersome, helmet-like form factor of OST-HMD systems, primarily focusing on achieving compact and lightweight form factors. Several optical technologies have been explored, resulting in significant advances in OST-HMDs. For instance, the well-advertised Google Glass® is a very compact, lightweight (~36 grams), monocular OST-HMD, providing the benefits of encumbrance-free instant access to digital information. Although it has demonstrated a promising and exciting future prospect of AR displays, the current version of Google Glass® has a very narrow FOV (approximately 15° FOV diagonally) with an image resolution of 640×360 pixels. It offers limited ability to effectively augment the real-world view in many applications.

Despite such promises a number of problems remain with existing OST-HMD's, such as visual discomfort of AR displays. Thus, it would be an advance in the art to provide OST-HMD's which provide increased visual comfort, while achieving low-cost, high-performance, lightweight, and true 3D OST-HMD systems.

SUMMARY OF THE INVENTION

In one of its aspects the present invention may provide a 3D augmented reality display having a microdisplay for providing a virtual 3D image for display to a user. For example, the optical approach of the present invention may uniquely combine the optical paths of an AR display system with that of a micro-InI subsystem to provide a 3D lightfield optical source. This approach offers the potential to achieve an AR display invulnerable to the accommodation-convergence discrepancy problem. Benefiting from freeform optical technology, the approach can also create a lightweight and compact OST-HMD solution.

In this regard, in one exemplary configuration of the present invention, display optics may be provided to receive optical radiation from the microdisplay and may be configured to create a 3D lightfield, that is, a true optically reconstructed 3D real or virtual object from the received radiation. (As used herein the term "3D lightfield" is defined to mean the radiation field of a 3D scene comprising a collection of light rays appearing to be emitted by the 3D scene to create the perception of a 3D scene.) An eyepiece in optical communication with the display optics may also be included, with the eyepiece configured to receive the 3D lightfield from the display optics and deliver the received radiation to an exit pupil of the system to provide a virtual display path. The eyepiece may include a selected surface configured to receive the 3D lightfield from the display optics and reflect the received radiation to an exit pupil of the system to provide a virtual display path. The selected surface may also be configured to receive optical radiation from a source other than the microdisplay and to transmit such optical radiation to the exit pupil to provide a see-through optical path. The eyepiece may include a freeform prism shape. In one exemplary configuration the display optics may include integral imaging optics.

BRIEF DESCRIPTION OF THE DRAWINGS

The foregoing summary and the following detailed description of the exemplary embodiments of the present invention may be further understood when read in conjunction with the appended drawings, in which:

FIG. 3 schematically illustrates a diagram of a microscopic InI unit for creating a 3D lightfield of a 3D scene for use in devices and methods of the present invention;

FIG. 4 schematically illustrates a diagram of an alternative exemplary microscopic InI (micro-InI) unit in accordance with the present invention for creating a 3D lightfield of a 3D scene where the virtual lightfield is telecentric;

FIGS. 6A to 6C schematically illustrate an exemplary design of a 3D augmented reality optical see-through HMD in accordance with the present invention using freeform optical technology, in which FIG. 6A illustrates an exemplary freeform eyepiece for 3D lightfield display, FIG. 6B illustrates an exemplary freeform corrector lens to correct viewing axis deviations and aberrations, and FIG. 6C illustrates an integrated optical layout and raytracing;

DETAILED DESCRIPTION OF THE INVENTION

Despite current commercial development of HMDs, very limited efforts have been made to address the challenge of minimizing visual discomfort of AR displays, which is a critical concern in applications requiring an extended period of use. One of the key factors causing visual discomfort is the accommodation-convergence discrepancy between the displayed digital information and the real-world scene, which is a fundamental problem inherent to most of the existing AR displays. The accommodation cue refers to the focus action of the eye where ciliary muscles change the refractive power of the crystalline lens and therefore minimize the amount of blur for the fixated depth of the scene. Associated with eye accommodation change is the retinal image blur cue which refers to the image blurring effect varying with the distance from the eye's fixation point to the points nearer or further away. The accommodation and retinal image blurring effects together are known as focus cues. The convergence cue refers to the rotation action of the eyes to bring the visual axes inward or outward to intersect at a 3D object of interest at near or far distances.

Figure 1A:
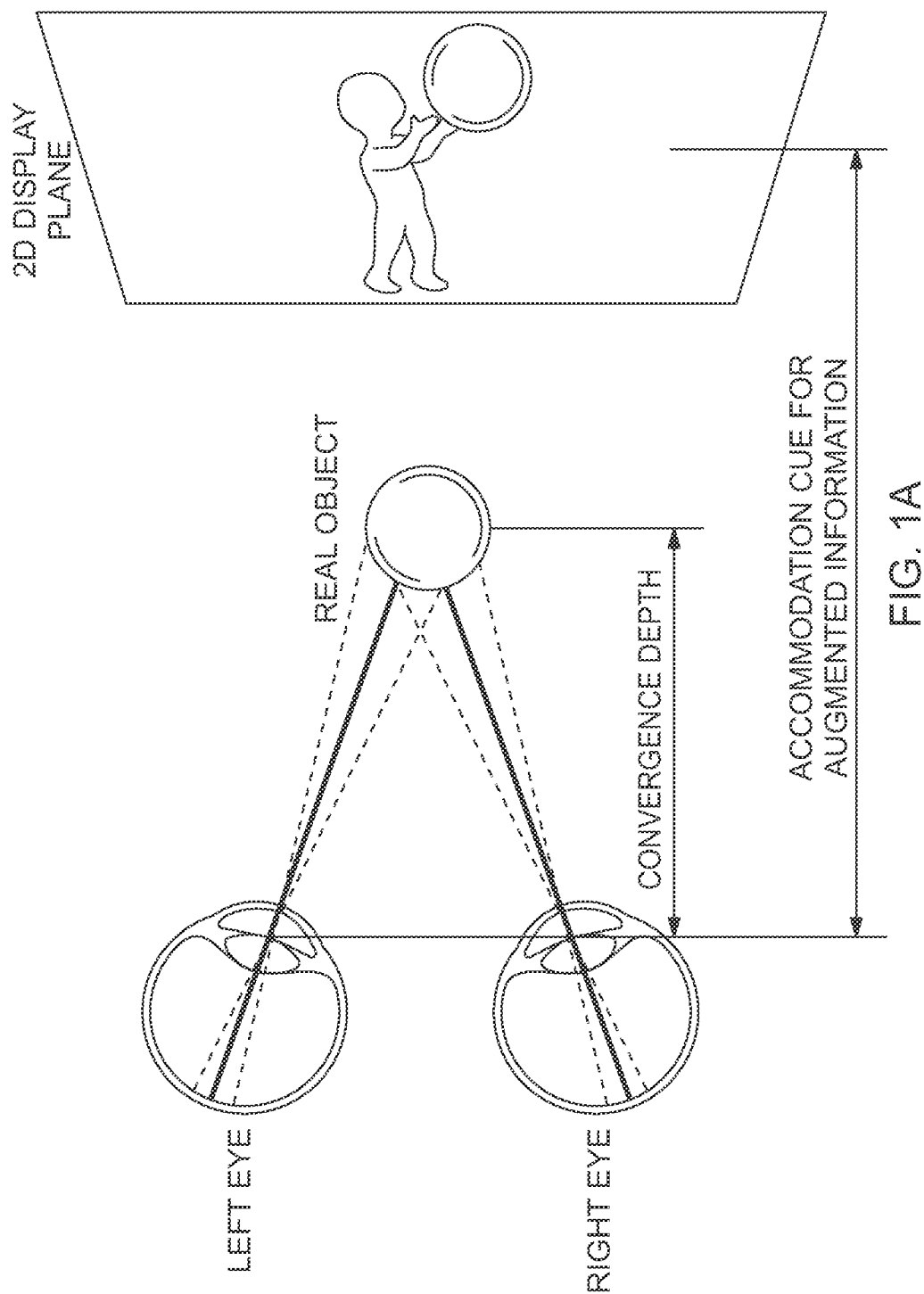
FIGS. 1A to 1C schematically illustrate accommodation-convergence cues in a monocular AR display (FIG. 1A); a binocular display (FIG. 1B); and, viewing a real object (FIG. 1C)
Figure 1B:
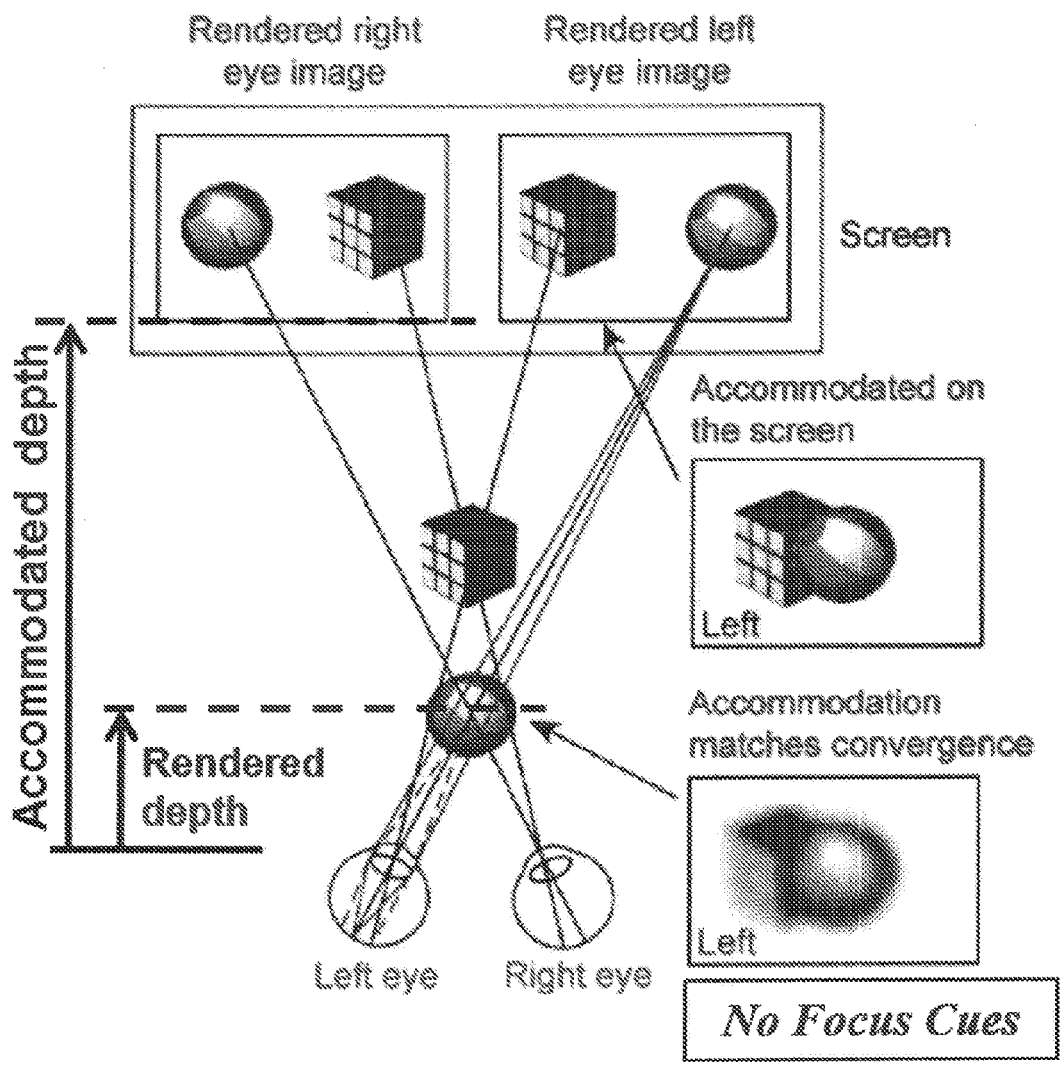
Figure 1C:
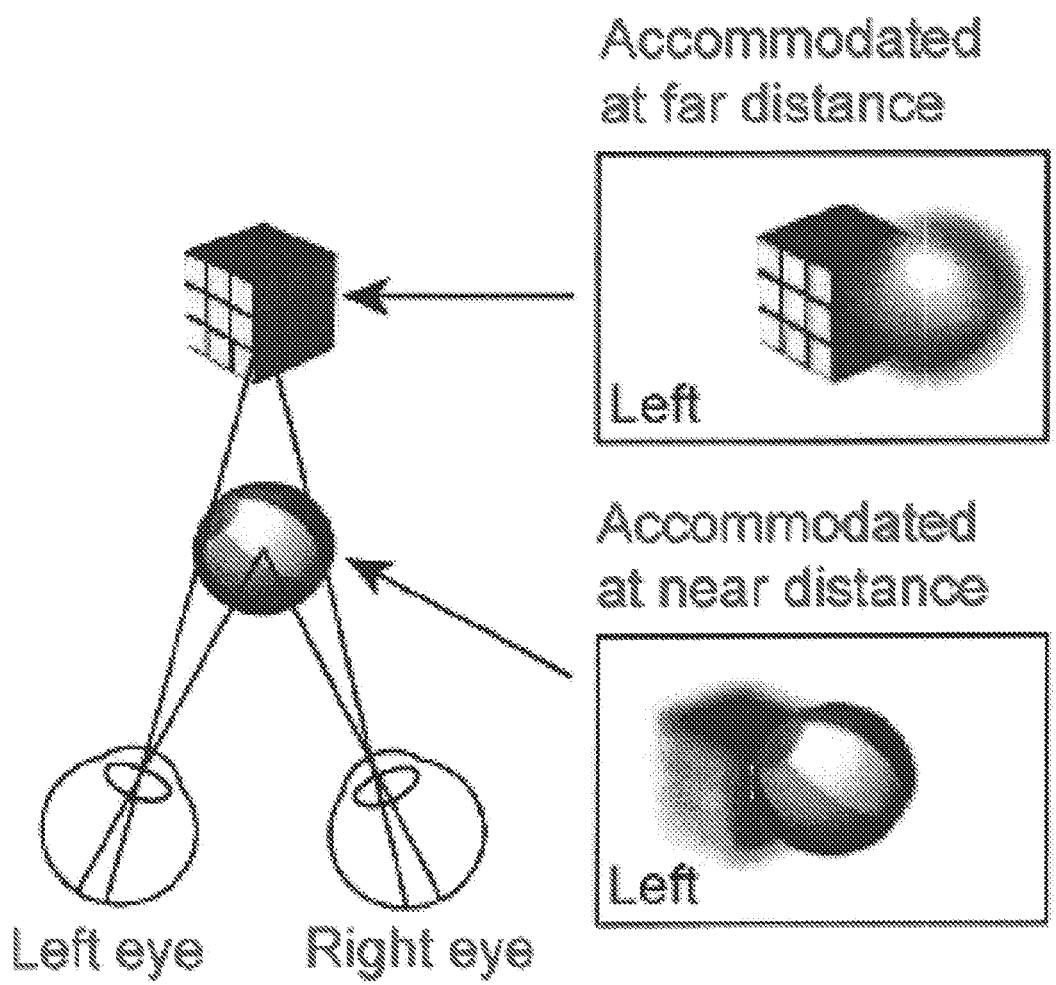

The accommodation-convergence mismatch problem stems from the fact that the image source in most of the existing AR displays is a 2D flat surface located at a fixed distance from the eye. Consequently, this type of AR display lacks the ability to render correct focus cues for digital information that is to be overlaid over real objects located at distances other than the 2D image source. It causes the following three accommodation-convergence conflict. (1) There exists a mismatch of accommodation cues between the 2D image plane and the real-world scene (FIG. 1A). The eye is cued to accommodate at the 2D image plane for viewing the augmented information while the eye is concurrently cued to accommodate and converge at the depth of a real 3D object onto which the digital information is overlaid. The distance gap between the display plane and real-world objects can be easily beyond what the human visual system (HVS) can accommodate simultaneously. A simple example is the use of an AR display for driving assistance where the eyes need to constantly switch attention between the AR display and real-world objects spanning from near (e.g. dashboard) to far (e.g. road signs). (2) In a binocular stereoscopic display, by rendering a pair of stereoscopic images with binocular disparities, the augmented information may be rendered to appear at a different distance from the 2D display surface (FIG. 1B). When viewing augmented information, the eye is cued to accommodate at the 2D display surface to bring the virtual display in focus but at the same time the eye is forced to converge at the depth dictated by the binocular disparity to fuse the stereoscopic pair. In viewing a natural scene (FIG. 1C), the eye convergence depth coincides with the accommodation depth and objects at depths other than the object of interest are seen blurred. (3) Synthetic objects rendered via stereoscopic images, regardless of their rendered distance from the user, are seen all in focus if the viewer focuses on the image plane, or are seen all blurred if the user accommodates at distances other than the image plane. The retinal image blur of a displayed scene does not vary with the distances from an eye fixation point to other points at different depths in the simulated scene. In a nutshell, the incorrect focus cues may contribute to issues in viewing stereoscopic displays, such as distorted depth perception, diplopic vision, visual discomfort and fatigue, and degradation in oculomotor response.

In one of its aspects the present invention relates to a novel approach to OST-HMD designs by combining 3D lightfield creation technology and freeform optical technology. 3D lightfield creation technology of the present invention reconstructs the radiation field of a 3D scene by creating a collection of light rays appearing to be emitted by the 3D scene and creating the perception of a 3D scene. Thus, as used herein the term "3D lightfield" is defined to mean the radiation field of a 3D scene comprising a collection of light rays appearing to be emitted by the 3D scene to create the perception of a 3D scene. The reconstructed 3D scene creates a 3D image source for HMD viewing optics, which enables the replacement of a typical 2D display surface with a 3D source and thus potentially overcomes the accommodation-convergence discrepancy problem. Any optical system capable of generating a 3D lightfield may be used in the devices and methods of the present invention. For instance, one exemplary configuration of the present invention uses micro integral imaging (micro-InI) optics for creating a full-parallax 3D lightfield to optically create the perception of the 3D scene. (Persons skilled in the art will be aware that Integral imaging (InI) is a multi-view imaging and display technique that captures or displays the light fields of a 3D scene by utilizing an array of pinholes, lenses or microlenses. In the case of being a display technique, a microlens array in combination with a display device, which provides a set of elemental images each having information of a different perspective of the 3D scene. The microlens array in combination with the display device renders ray bundles emitted by different pixels of the display device, and these ray bundles from different pixels intersect and optically create the perception of a 3D point that appears to emit light and occupy the 3D space. This method allows the reconstruction of a true 3D image of the 3D scene with full parallax information in all directions.) Other optical system capable of generating a 3D lightfield which may be used with the present invention include, but not limited to, holographic display (M. Lucente, "Interactive three-dimensional holographic displays: seeing the future in depth," Computer Graphics, 31(2), pp. 63-67, 1997; P. A. Blanche, et al, "Holographic three-dimensional telepresence using large-area photorefractive polymer", Nature, 468, 80-83, November 2010), multi-layer computational lightfield display (G. Wetzstein et al., "Tensor Displays: Compressive light field synthesis using multilayer displays with directional backlighting," ACM Transactions on Graphics, 31(4), 2012.), and volumetric displays (Blundell, B. G., and Schwarz, A. J., "The classification of volumetric display systems: characteristics and predictability of the image space," IEEE Transaction on Visualization and Computer Graphics, 8(1), pp. 66-75, 2002. J. Y. Son, W. H. Son, S. K. Kim, K. H. Lee, B. Javidi, "Three-Dimensional Imaging for Creating Real-World-Like Environments," Proceedings of IEEE Journal, Vol. 101, issue 1, pp. 190-205, January 2013.).

A micro-InI system has the potential of achieving full-parallax 3D object reconstruction and visualization in a very compact form factor suitable for a wearable system. It can dramatically alleviate most of the limitations in a conventional autostereoscopic InI display due to the benefit of well-constrained viewing positions and can be effectively utilized for addressing the accommodation-convergence discrepancy problem in conventional HMD systems. The micro-InI unit can reconstruct a miniature 3D scene through the intersection of propagated ray cones from a large number of recorded perspective images of a 3D scene. By taking advantage of the freeform optical technology, the approach of the present invention can result in a compact, lightweight, goggle-style AR display that is potentially less vulnerable to the accommodation-convergence discrepancy problem and visual fatigue. Responding to the accommodation-convergence discrepancy problem of existing AR displays, we developed an AR display technology with the ability to render the true lightfield of a 3D scene reconstructed optically and thus accurate focus cues for digital information placed across a large depth range.

The challenges of creating a lightweight and compact OST-HMD solution, invulnerable to the accommodation-convergence discrepancy problem, are to address two cornerstone issues. The first is to provide the capability of displaying a 3D scene with correctly rendered focus cues for a scene's intended distance correlated with the eye convergence depth in an AR display, rather than on a fixed-distance 2D plane. The second is to create an optical design of an eyepiece with a form factor as compelling as a pair of eyeglasses.

Figure 2:
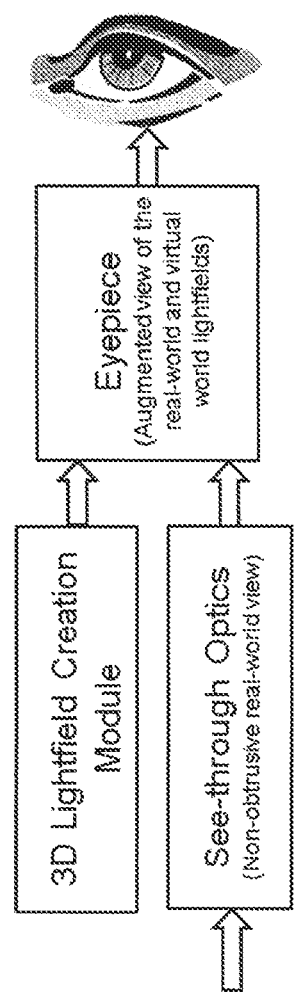
FIG. 2 schematically illustrates a block diagram of an exemplary 3D-OST-HMD system in accordance with the present invention, comprising a microscopic integral imaging (InI) unit, see-through optics, and eyepiece.

A block diagram of a 3D OST-HMD system in accordance with the present invention is illustrated in FIG. 2. It includes three principal subsystems: a lightfield creation module ("3D Lightfield Creation Module") reproducing the full-parallax lightfields of a 3D scene seen from constrained viewing zones; an eyepiece relaying the reconstructed 3D lightfields into a viewer's eye; and a see-through system ("See-through Optics") optically enabling a non-obtrusive view of the real world scene.

In one of its aspects, the present invention provides an innovative OST-HMD system that integrates the 3D micro-InI method for full-parallax 3D scene optical visualization with freeform optical technology for OST-HMD viewing optics. This approach enables the development of a compact 3D InI optical see-through HMD (InI-OST-HMD) with full-parallax lightfield rendering capability, which is anticipated to overcome the persisting accommodation-convergence discrepancy problem and to substantially reduce visual discomfort and fatigue experiences of users.

Full-parallax lightfield creation method. An important step to address the accommodation-convergence discrepancy problem is to provide the capability of correctly rendering the focus cues of digital information regardless of its distance to the viewer, rather than rendering digital information on a fixed-distance 2D surface. Among the different non-stereoscopic display methods, we chose to use an InI method that allows the reconstruction of the full-parallax lightfields of a 3D scene appearing to be emitted by a 3D scene seen from constrained or unconstrained viewing zones. Compared with all other techniques, an InI technique requires a minimal amount of hardware complexity, which makes it possible to integrate it with an OST-HMD optical system and create a wearable true 3D AR display.

FIG. 3 schematically illustrates an exemplary micro-InI unit 300. A set of 2D elemental images 301, each representing a different perspective of a 3D scene, are displayed on a high-resolution microdisplay 310. Through a microlens array (MLA) 320, each elemental image 301 works as a spatially-incoherent object and the conical ray bundles emitted by the pixels in the elemental images 301 intersect and integrally create the perception of a 3D scene, in which objects appear to be located along the surface AOB having a depth range $Z_0$ at a reference plane, for example, to provide the appearance to emit light and occupy the 3D space. The microlens array may be placed a distance "g" from the microdisplay 310 to create either a virtual or a real 3D scene. The micro-InI unit 300 allows the optical reconstruction of a 3D surface shape with full parallax information. It should be noted that an InI-based 3D display operates fundamentally differently from multi-view stereoscopic systems where a lenticular sheet functions as a spatial de-multiplexer to select appropriate discrete left-eye and right-eye planar views of a scene dependent on viewer positions. Such multi-view systems produce a defined number of binocular views typically with horizontal parallax only and may continue to suffer from convergence accommodation conflict.

FIG. 4 schematically illustrates an alternative configuration of a micro-InI unit 400 in accordance with the present invention that creates a telecentric 3D lightfield of a 3D scene at surface AOB. A primary difference from the configuration of FIG. 3 lies in the use of additional lenses (lens 430 and/or lens 440) which help to relay the apertures of a microlens array (MLA) 420 and creates a telecentric 3D lightfield. (R. Martinez-Cuenca, H. Navarro, G. Saavedra, B. Javidi, and M. Martínez-Corral, "Enhanced viewing-angle integral imaging by multiple-axis telecentric relay system," Optics Express, Vol. 15, Issue 24, pp. 16255-16260, 21 Nov. 2007.) Lens 430 and lens 440 have the same focal distance, $f_1=f_2$, with lens 430 directly attached to the MLA 420 and lens 440 placed at a focal distance, $f_1$, away. The gap between the microdisplay 410 and the MLA 420 is the same as the focal distance, $f_0$, of the MLA 420. The main advantages of this alternative design are the potential increase of viewing angle for the reconstructed 3D scene, compactness, ease of integration with the HMD viewing optics, and blocking of the flipped images created by rays refracted by microlenses 421 of the MLA 420 other than the correctly paired elemental image 401 and microlens 421.

Figure 7:
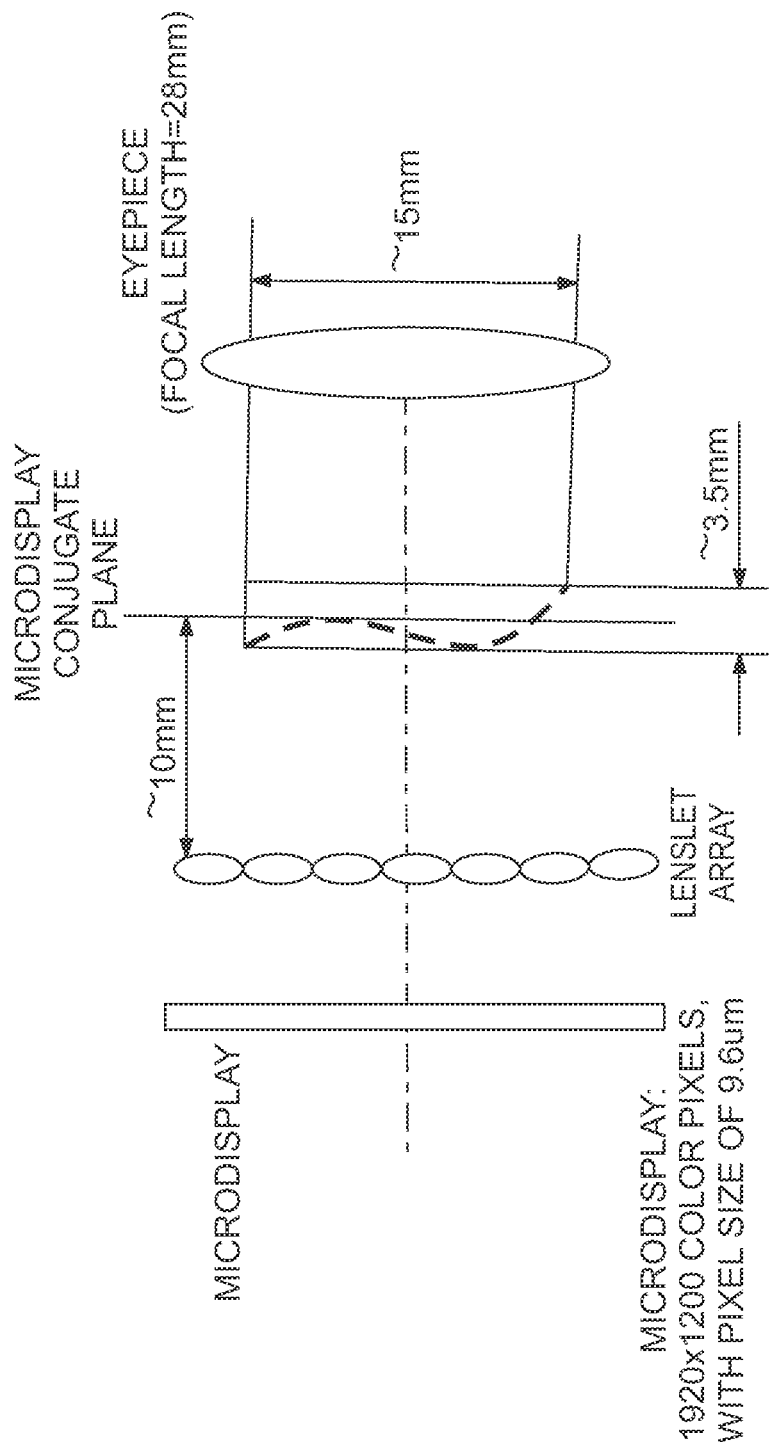
FIG. 7 schematically illustrates an exemplary micro-InI module and eyepiece in accordance with the present invention.

Although the InI method is promising, improvements are still desirable due to three major limitations: (1) low lateral and longitudinal resolutions; (2) narrow depth of field (DOF); and (3) limited field of view angle. These limitations are subject to the limited imaging capability and finite aperture of microlenses, poor spatial resolution of large-size displays, and the trade-off relationship between wide view angle and high spatial resolution. Conventional InI systems typically yield low lateral and depth resolutions and narrow DOF. These limitations, however, can be alleviated in a wearable InI-HMD system of the present invention. First, microdisplays with large pixel counts and very fine pixels (e.g. ~5 μm pixel size) may be used in the present invention to replace large-pixel display devices (~200-500 μm pixel size) used in conventional InI displays, offering at least 50× gain in spatial resolution, FIG. 7. Secondly, due to the nature of HMD systems, the viewing zone is well confined and therefore a much smaller number of elemental images would be adequate to generate the full-parallax lightfields for the confined viewing zone than large-size autostereoscopic displays. Thirdly, to produce a perceived 3D volume spanning from 40 cm to 5 m depth range in an InI-HMD system, a very narrow depth range (e.g. $Z_0$~3.5 mm) is adequate for the intermediate 3D scene reconstructed by the micro-InI unit, which is much more affordable than in a conventional stand-alone InI display system requiring at least 50 cm depth range to be usable, FIG. 7. Finally, by optimizing the microlenses and the HMD viewing optics together, the depth resolution of the overall InI-HMD system can be substantially improved, overcoming the imaging limit of a stand-alone InI system.

The lightfields of the miniature 3D scene reconstructed by a micro-InI unit may be relayed by eyepiece optics into the eye for viewing. The eyepiece optics not only effectively couples the 3D lightfields into the eye (exit) pupil but may also magnify the 3D scene to create a virtual 3D display appearing to be at a finite distance from the viewer.

Figure 5:
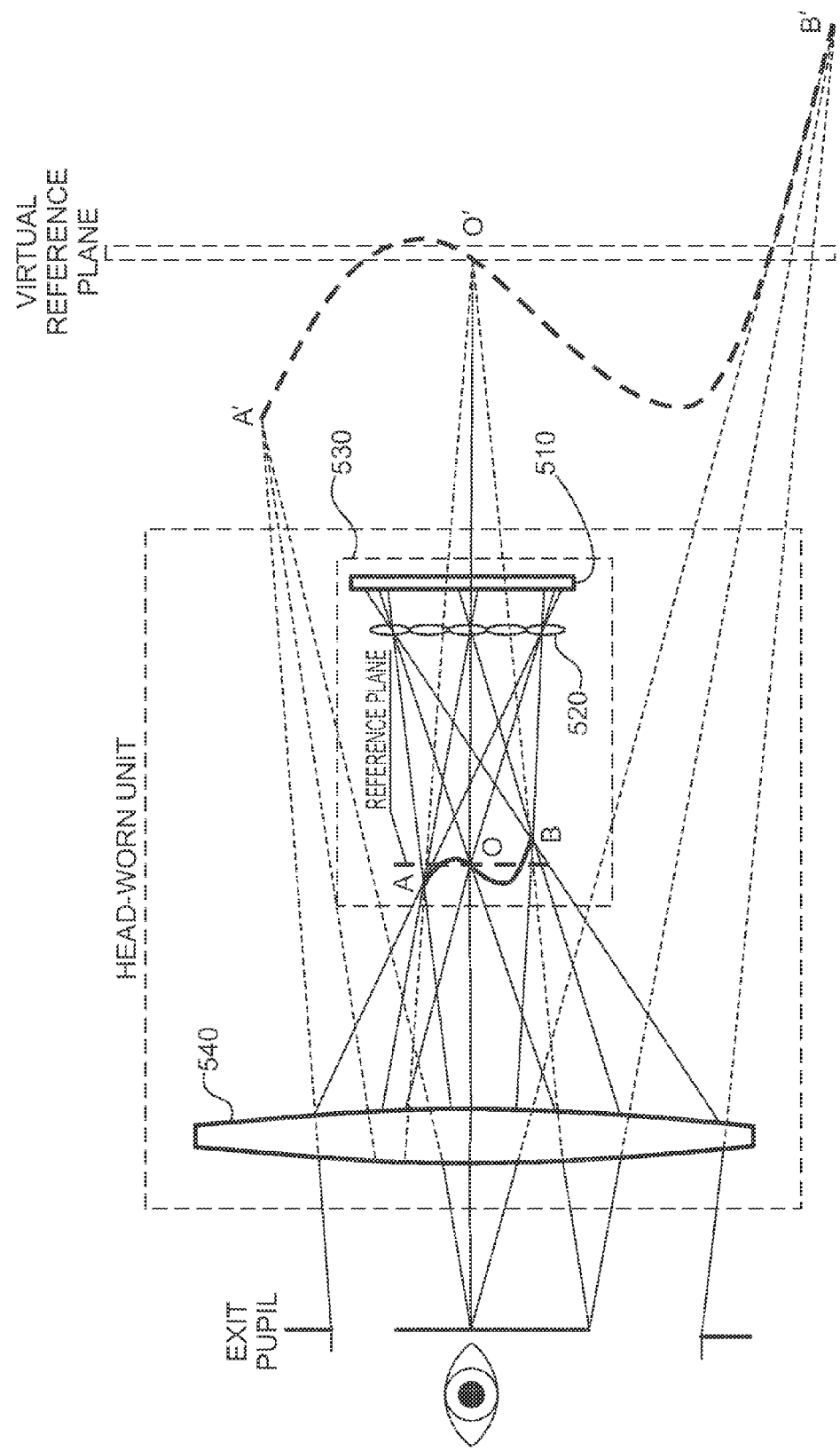
FIG. 5 schematically illustrates a diagram of an exemplary head-worn 3D integral imaging display system in accordance with the present invention, which integrates a micro-InI unit and conventional eyepiece optics for creating a virtual lightfield of a 3D scene.

As an example, FIG. 5 schematically illustrates the integration of a micro-InI unit 530 with conventional eyepiece optics 540. The micro-InI unit 530 may include a microdisplay 510 and microlens array 520 that may be configured in a similar manner to that illustrated in FIG. 3. The micro-InI unit 530 reconstructs a miniature 3D scene (located at AOB in FIG. 5) which is located near the back focal point of the eyepiece optics 540. Through the eyepiece optics 540 the miniature scene may be magnified into an extended 3D display at A'O'B' which can then be viewed from a small zone constrained by the exit pupil of the eyepiece optics 540. Due to the 3D nature of the reconstructed scene, a different viewing perspective is seen at different locations within the exit pupil.

Figure 6B:
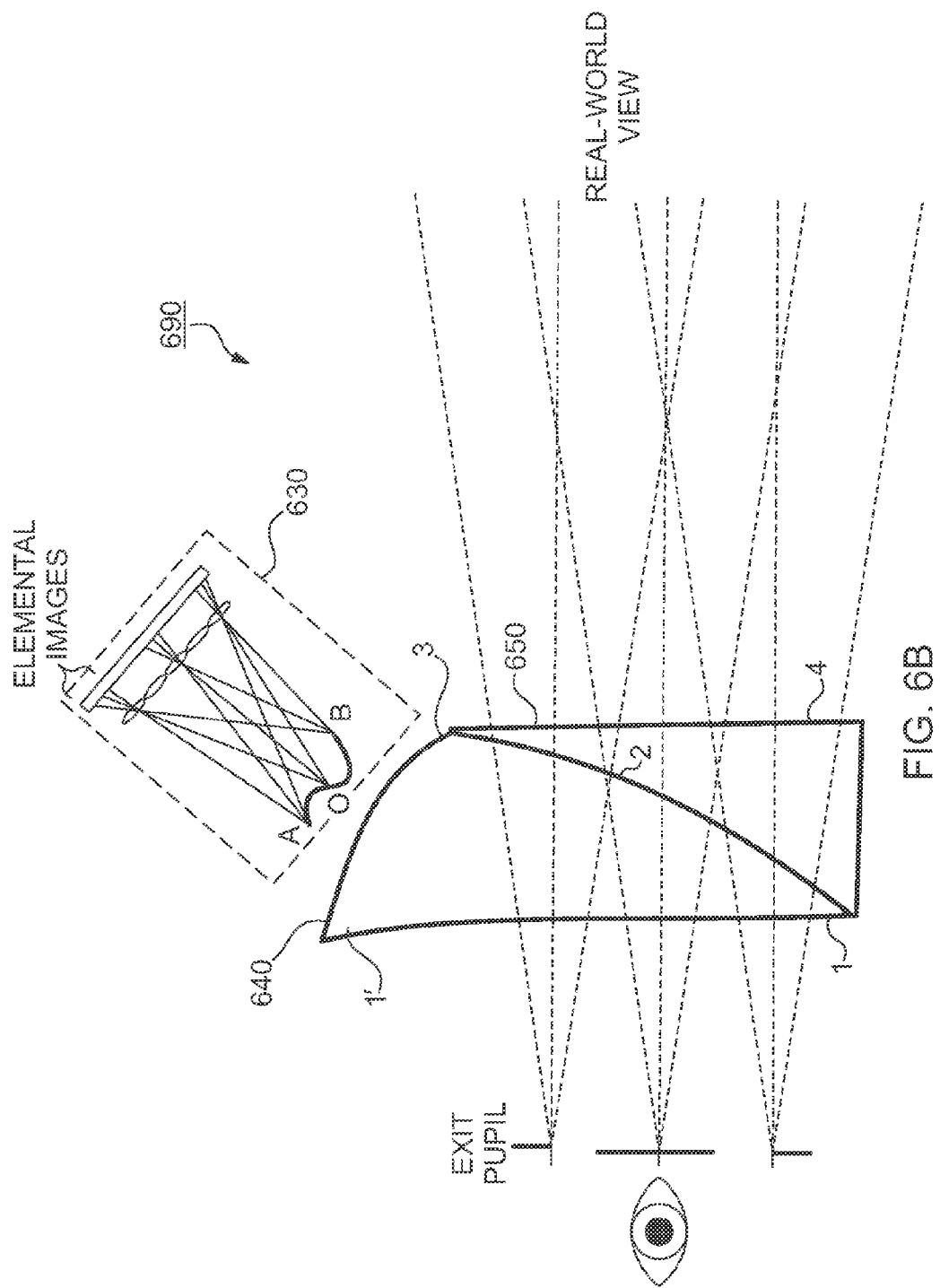

Among the different methods for HMD designs, freeform optical technology demonstrates great promise in designing compact HMD systems. FIG. 6A illustrates the schematics of an exemplary configuration of a wearable 3D augmented reality display 600 in accordance with the present invention. The wearable 3D augmented reality display 600 includes a 3D InI unit 630 and a freeform eyepiece 640. The micro-InI unit 630 may include a microdisplay 610 and microlens array 620 that may be configured in a similar manner to that illustrated in FIG. 3. This configuration 600 adopts a wedge-shaped freeform prism as the eyepiece 640, through which the 3D scene reconstructed by the micro-InI unit 630 is magnified and viewed. Such eyepiece 640 is formed by three freeform optical surfaces which are labeled as 1, 2, and 3, respectively, which may be rotationally asymmetric surfaces. The exit pupil is where the eye is placed to view the magnified 3D scene, which is located of the virtual reference plane conjugate to the reference plane of the 3D InI unit 630. A light ray emitted from a 3D point (e.g. A) located at the intermediate scene is first refracted by the surface 3 of the freeform eyepiece 640 located closest to the reference plane. Subsequently, the light ray experiences two consecutive reflections by the surfaces 1' and 2, and finally is transmitted through the surface 1 and reaches the exit pupil of the system. Multiple ray directions from the same object point (e.g. each of the 3 rays from point A), each of which represents a different view of the object, impinge on different locations of the exit pupil and reconstruct a virtual 3D point (e.g. A') in front of the eye.

Rather than requiring multiple elements, the optical path is naturally folded within a three-surface prism structure of the eyepiece 640, which helps reduce the overall volume and weight of the optics substantially when compared with designs using rotationally symmetric elements.

Figure 6C:
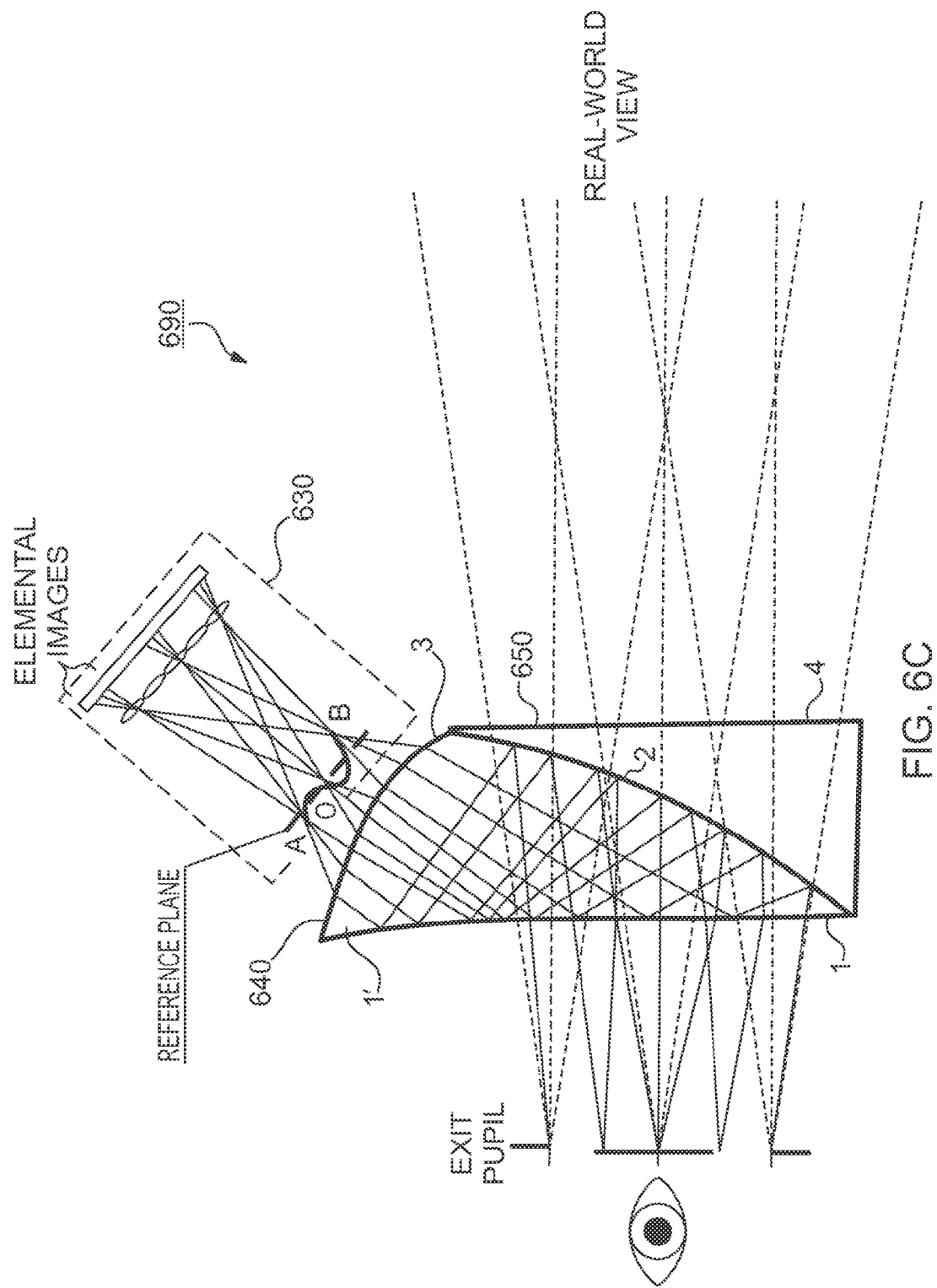

To enable see-through capability for AR systems, surface 2 of the eyepiece 640 may be coated as a beam splitting mirror. A freeform corrector lens 650 may be added to provide a wearable 3D augmented reality display 690 having improved see-through capability. The corrector lens 650 may include two freeform surfaces which may be attached to the surface 2 of the eyepiece 640 to correct the viewing axis deviation and undesirable aberrations introduced by the freeform prism eyepiece 640 to the real world scene. The rays from the virtual lightfield generated by the 3D InI unit 630 are reflected by surface 2 of the prism eyepiece 640, while the rays from a real-world scene are transmitted through the freeform eyepiece 640 and corrector lens 650, FIG. 6C. FIG. 6C schematically illustrates the integration and raytracing of the overall wearable 3D augmented reality display 690. The front surface of the freeform corrector lens 650 matches the shape of surface 2 of the prism eyepiece 640. The back surface 4 of the corrector lens 650 may be optimized to minimize the shift and distortion introduced to the rays from a real-world scene when the corrector lens 650 is combined with the prism eyepiece 640. The additional corrector lens 650 is not expected to noticeably increase the footprint and weight of the overall system 690.

Thus, in devices of the present invention, the freeform eyepiece 640 may image the lightfield of a 3D surface AOB, rather than a 2D image surface. In such an InI-HMD system 600, 690, the freeform eyepiece 640 can reconstruct the lightfield of a virtual 3D object A'O'B' at a location optically conjugate to the lightfield of a real object, while in a conventional HMD system the eyepiece creates a magnified 2D virtual display which is optically conjugate to the 2D microdisplay surface.

Figure 6D:
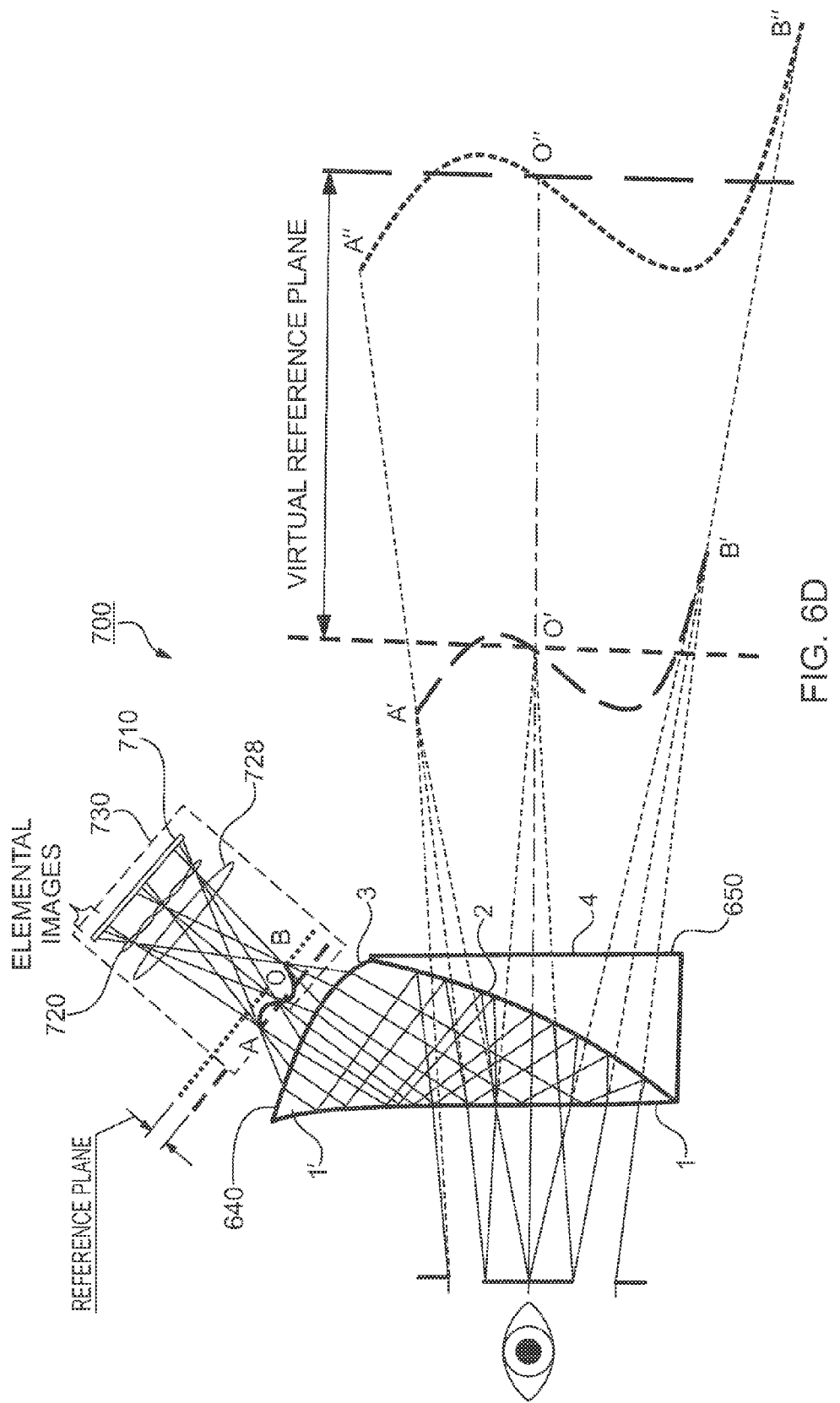
FIG. 6D schematically illustrates an exemplary design of a 3D augmented reality optical see-through HMD in accordance with the present invention including a vari-focal element.

In another of its aspects, the present invention may provide a 3D augmented reality optical see-through HMD 700 in which the location of the virtual reference plane may be adjusted, FIG. 6D. The ability to adjust the location of the virtual reference plane may be particularly useful in addressing the accommodation-convergence discrepancy by selecting the location of the virtual reference plane containing the augmented reality information relative to the location of objects in the real world scene being observed by the viewer. In this regard, FIG. 6D schematically illustrates an alternative configuration of a 3D augmented reality optical see-through HMD 700 in accordance with the present invention which integrates a vari-focal element 728 in the optical path of a micro-InI module 730. As with the design of FIG. 6C, the HMD 700 may include an eyepiece 640, corrector lens 650, and a micro-InI unit 730 with a microdisplay 710 and microlens array 720, which may be identical to those used in FIG. 6C.

The optical power of the vari-focal element 728 (VFE) may be varied by applying an electrical voltage to the element. Examples of vari-focal elements 728 that may be used include liquid crystal lenses, liquid lenses, membrane mirrors, or birefringent lenses. Having the ability to dynamically change the optical power of the micro-InI unit 730 not only allows dynamic control of the axial position of the reference plane of the 3D reconstructed scene, but also enables dynamic adjustment of the view angle of the reconstructed scene. For instance, varying the voltage on the VFE 728 allows one to place the virtual reference plane at a distance as close as 25 cm (e.g. at O') or as far as optical infinity (e.g. at O") or vice versa without having to make mechanical changes. Varying the optical power of the VFE 728 also enables dynamic control on the ray angles of the light reconstructing the 3D scene and thus controls the viewing angle. This capability enabled through the VFE 728 allows one to improve the longitudinal resolution, extend the depth of field, and increase viewing angles. The change of optical power on the VFE 728 may be controlled by the knowledge of the 3D scene depth to be rendered, or the knowledge of the user's region of interest. For instance, knowing the absolute depth of the reconstructed virtual scene (e.g. A'O'B') with respect to the viewer and the depth range of the scene allows the system to properly position the virtual reference plane with optimal longitudinal resolution and viewing angle. Alternatively, the region of interest of the viewer, which may be detected through an eye movement tracking device, may be dynamically acquired and utilized to position the virtual reference plane accordingly. When both the VFE 728 and the microdisplay 710 operate at high speed (e.g., at least twice the critical flickering frequency of the human visual system), 3D scenes of different depths can be rendered time sequentially with the reference plane placed over these depths to cover an extended depth volume. The time-sequentially rendered scenes may then be viewed as a continuous 3D volume due to the advantage of the speed. A liquid crystal lens 728 may be used for varying the depth of field of the integral imaging display. Other types of spatial light modulators may be used as well such as deformable mirror devices for high speed modulation.

Figure 6E:
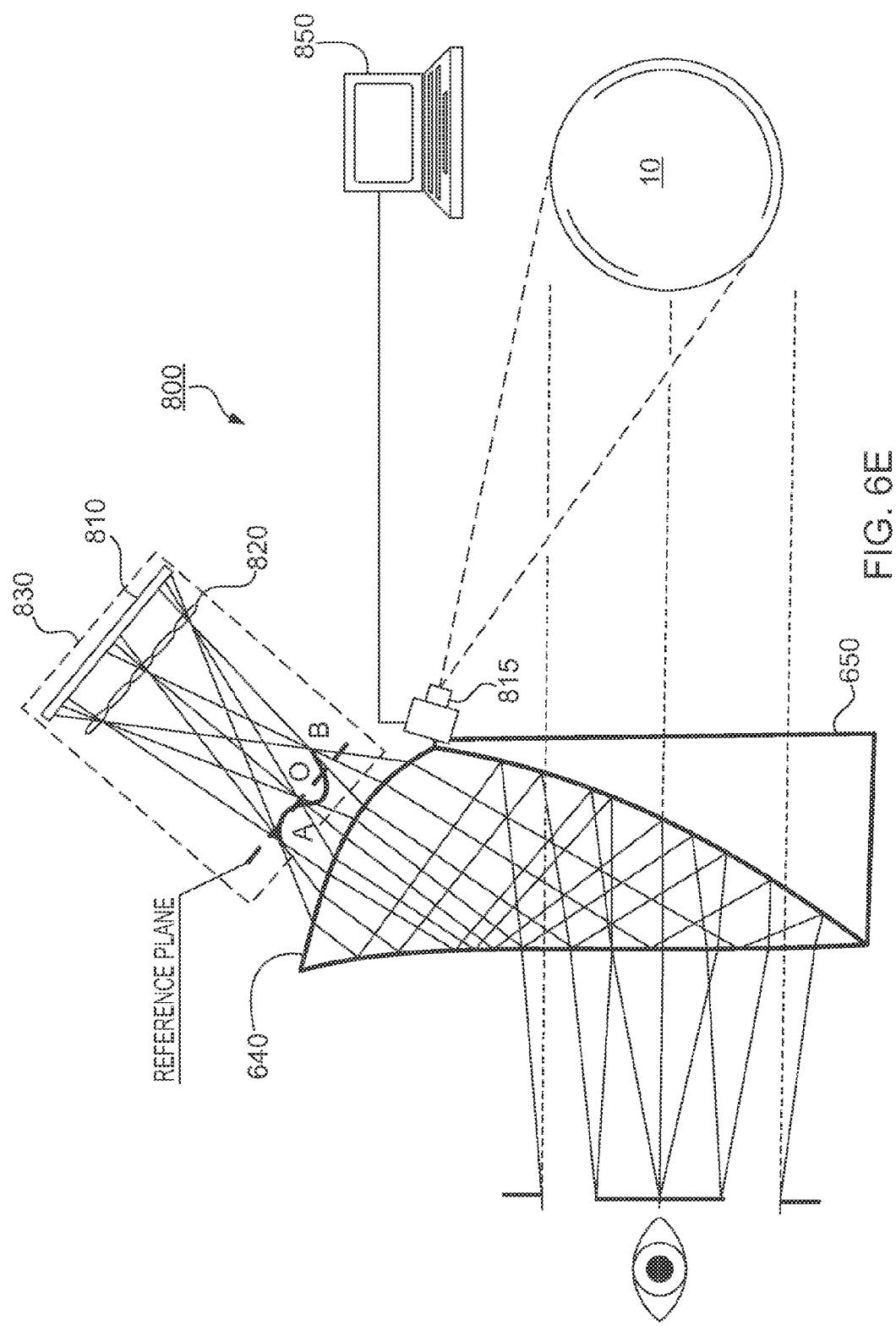
FIG. 6E schematically illustrates an exemplary design of a 3D augmented optical see-through HMD in accordance with the present invention including 3D and/or 2D object recognition.

In yet another of its aspects, the present invention may provide a 3D augmented reality optical see-through HMD 800 which integrates three-dimensional (3D) or 2D object recognition capability, FIG. 6E. For example, FIG. 6E schematically illustrates an alternative configuration of a 3D augmented reality optical see-through HMD 800 in accordance with the present invention which integrates three-dimensional (3D) or 2D object recognition capability with augmented reality (AR). As with the design of FIG. 6C, the HMD 800 may include an eyepiece 640, corrector lens 650, and a micro-InI unit 830 with a microdisplay 810 and microlens array 820, which may be identical to those used in FIG. 6C. The HMD 800 may combine an integral imaging optical 3D display method and 2D/3D object recognition capability by attaching at least one camera 815 to the HMD 800, FIG. 6E. The current state of the art allows the availability of light weight mega pixel cameras as small as one millimeter square. (Sony 960H Micro Pinhole Covert Camera #20-100.) The camera 815 may be a regular video camera, but more importantly it can be a 3D integral imaging image capture system where a micro lenslet array is utilized in the imaging optics to capture the 3D lightfield of the real-world scene 10. Using the images captured by such a camera 815, one can implement either 2D imaging or 3D integral imaging acquisition, numerical visualization, and 2D or 3D object recognition, segmentation, and localization of objects in the scene 10. While the real scene 10 is observed by the user directly through the free form optics 640, 650, object recognition capability enabled by the capture unit 850 can allow the intelligent extraction of information about the detected objects and scene, their description, their position, their range using (3D imaging properties of integral imaging), their relation with other objects in the scene, etc and such information can be presented to the viewer through augmenting of the reality. For example, if the viewer is looking for a particular object in a crowded scene, the recognition capability can detect this object and present it, including its location to the viewer using AR. A variety of architectures can be used for the 3D object visualization, which may be run on a general purpose computer to provide the capture unit 850. (S. Hong, J. Jong, and B. Javidi, "Three-dimensional volumetric object reconstruction using computational integral imaging," Journal of Optics Express, on-line Journal of the Optical Society of America, Vol. 12, No. 3, pp. 483-491, Feb. 9, 2004. R. Schulein, M. Danesh-Panah, and B. Javidi, "3D imaging with axially distributed sensing," Journal of Optics Letters, Vol. 34, Issue 13, pp. 2012-2014, 1 Jul. 2009) or recognition. (S. Kishk and B. Javidi, "Improved Resolution 3D Object Sensing and Recognition using time multiplexed Computational Integral Imaging," Optics Express, on-line Journal of the Optical Society of America, vol. 11, no. 26, pp. 3528-3541, Dec. 29, 2003. R. Schulein, C. Do, and B. Javidi, "Distortion-tolerant 3D recognition of underwater objects using neural networks," Journal of Optical Society of America A, vol. 27, no. 3, pp 461-468, March 2010. C. Manh Do, R. Martínez-Cuenca, and B. Javidi, "Three-dimensional object-distortion-tolerant recognition for integral imaging using independent component analysis," Journal of Optical Society of America A 26, issue 2, pp 245-251 (1 Feb. 2009). S. Hong and B. Javidi, "Distortion-tolerant 3D recognition of occluded objects using computational integral imaging," Journal of Optics Express, Vol. 14, Issue 25, pp. 12085-12095, Dec. 11, 2006.). A variety of algorithms can be used for 2D or 3D object recognition. (F. Sadjadi and B. Javidi, "Physics of Automatic Target Recognition," Springer-Verlag, New York, 2007. R. J. Schalkoff, Pattern Recognition: Statistical, Structural and Neural Approaches (Wiley, 1991). Christopher M. Bishop, Neural Networks for Pattern Recognition, Oxford University Press, Inc. New York, N.Y. 1995. A. K. Jain, Fundamentals of Digital Image Processing, Prentice Hall. M. Daneshpanah, B. Javidi, and E. Watson, "Three dimensional integral imaging with randomly distributed sensors," Journal of Optics Express, Vol. 16, Issue 9, pp. 6368-6377, Apr. 21, 2008. R. Schulein, M. DaneshPanah, and B. Javidi, "3D imaging with axially distributed sensing," Journal of Optics Letters, Vol. 34, Issue 13, pp. 2012-2014, 1 Jul. 2009). It is possible to have a 3D object recognition capability by using a single camera 815 when the viewer is moving. Or, it is possible to have a 3D object recognition capability by using a single camera 815 with zero parallax by using axially distributed sensing when the viewer is moving towards the object.

Examples

Figure 8:
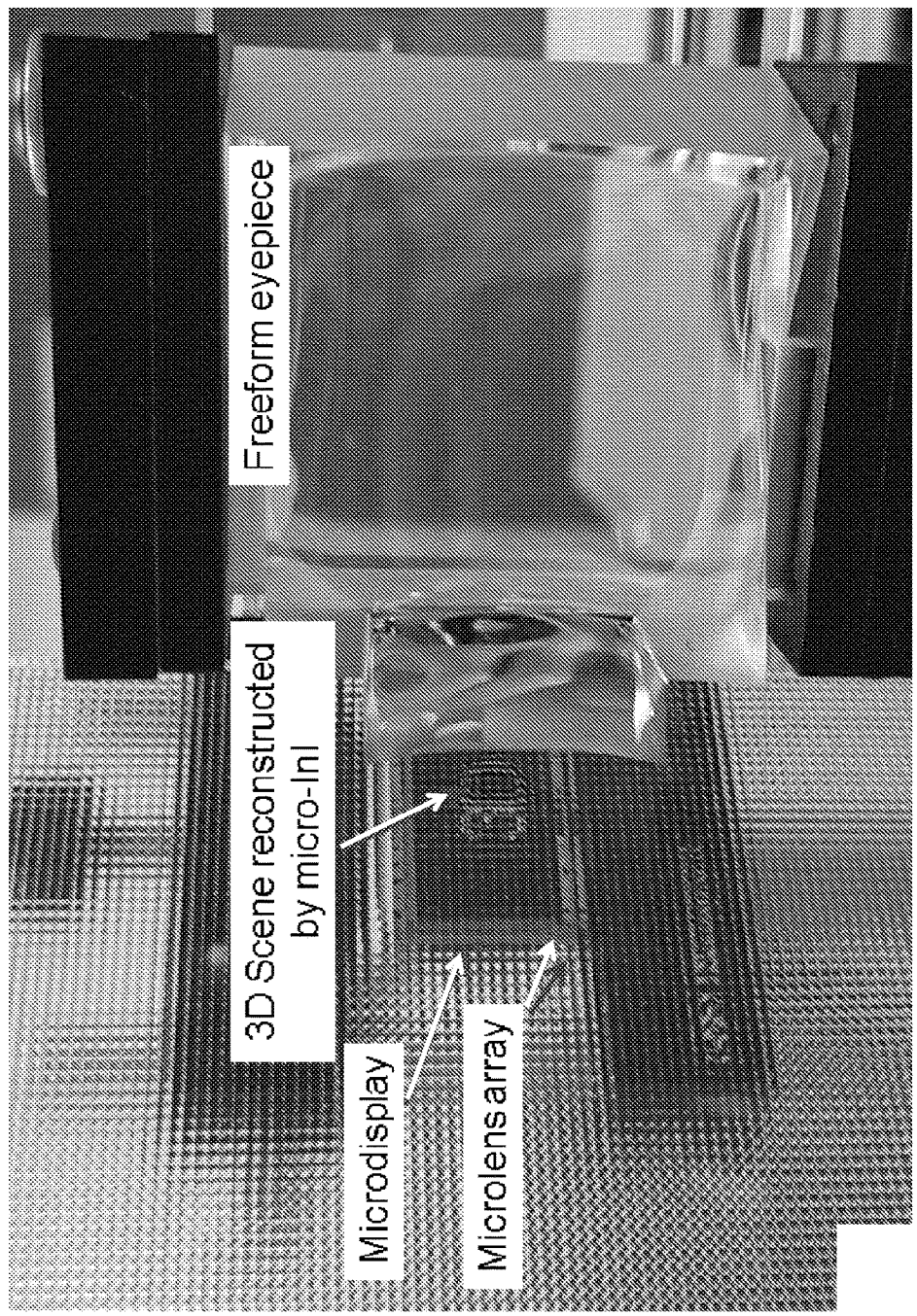
FIG. 8 illustrates an exemplary prototype of a microdisplay, microlens array, 3D scene reconstructed by micro-InI, and a free form eyepiece in accordance with the present invention.

A proof-of-concept monocular prototype of an InI OST-HMD according to the configuration of FIG. 6C was implemented using off-the-shelf optical components, FIG. 8. A micro-lens array (MLA) of a 3.3 mm focal length and 0.985 mm pitch was utilized. (These types of microlenses can be purchased from Digital Optics Corp, SUSS Microoptics, etc.) The microdisplay was a 0.8" organic light emitting display (OLED), which offered 1920×1200 color pixels with a pixel size of 9.6 nm. (EMA-100820, by eMagin Corp, Bellevue, Wash.) A freeform eyepiece along with a see-through corrector were used of the type disclosed in International Patent Application No. PCT/US2013/065422, the entire contents of which are incorporated herein by reference. The specifications of the eyepiece 640 and corrector 650 are provided in the tables below. The eyepiece offered a field of view of 40 degrees and approximately a 6.5 mm eyebox. Due to the strict telecentricity of the eyepiece design, it was adapted to the InI setup with reasonably low crosstalk but with a narrow viewing zone. It is worth noting that adapting this particular freeform eyepiece design is not required for implementing the optical method described in this invention. Alternative eyepieces may be designed and optimized for this purpose.

System Prescription for Display Path

In Table 1, surfaces #2-#4 specify the free-form eyepiece 640. Table 1 surfaces #2 and #4 represent the same physical surface and corresponds to eyepiece surface 1, in FIGS. 6A-6C. Table 1 surface #3 is corresponds eyepiece surface 2, and Table 1 surface #5 corresponds to eyepiece surface 3, in FIGS. 6A-6C.

TABLE 1

Surface prescription of eyepiece - AR display path.

| Surface No. | Surface Type | Y Radius | Thickness | Material | Refract Mode |
|---|---|---|---|---|---|
| 1 (Stop) | Sphere | Infinity | 0.000 | | Refract |
| 2 | XY Poly | −185.496 | 0.000 | PMMA | Refract |
| 3 | XY Poly | −67.446 | 0.000 | PMMA | Reflect |
| 4 | XY Poly | −185.496 | 0.000 | PMMA | Reflect |
| 5 | XY Poly | −830.046 | 0.000 | | Refract |
| 6 | Sphere | Infinity | 0.000 | | Refract |

TABLE 2

System prescription for see-through path.

| Surface No. | Surface Type | Y Radius | X Radius | Thickness | Material | Refract Mode |
|---|---|---|---|---|---|---|
| 1 (Stop) | Sphere | Infinity | Infinity | 0.000 | | Refract |
| 2 | XY Poly | −185.496 | −185.496 | 0.000 | PMMA | Refract |
| 3 | XY Poly | −67.446 | −67.446 | 0.000 | PMMA | Refract |
| 4 | XY Poly | −67.446 | −67.446 | 0.000 | PMMA | Refract |
| 5 | XY Poly | −87.790 | −87.790 | 10.00 | | Refract |
| 6 | Cylindrical | Infinity | −103.400 | 6.5 | NBK7 | Refract |
| 7 | Sphere | Infinity | Infinity | 0.000 | | Refract |

System Prescription for Optical See-Through Path

In Table 2 surfaces #2 and #3 are eyepiece surfaces 1 and 3, modeled the same as in the display path. Surfaces #4, #5 specify the freeform corrector lens 650. Surface #4 is an exact replica of Surface #3 (eyepiece surface 2).

TABLE 3

Optical surface prescription of Surface #2 and #4 of Table 1.

| | |
|---|---|
| Y Radius | −1.854965E+02 |
| Conic Constant | −2.497467E+01 |
| X | 0.000000E+00 |
| Y | 0.000000E+00 |
| $X^{**}2$ | −2.331157E−03 |
| $X * Y$ | 0.000000E+00 |
| $Y^{**}2$ | 6.691726E−04 |
| $X^{**}3$ | 0.000000E+00 |
| $X^{**}2 * Y$ | −1.066279E−04 |
| $X Y^{**}2$ | 0.000000E+00 |
| $Y^{**}3$ | −2.956368E−05 |
| $X^{**}4$ | −1.554280E−06 |
| $X^{**}3 * Y$ | 0.000000E+00 |
| $X^{**}2 * Y^{**}2$ | 1.107189E−06 |
| $X * Y^{**}3$ | 0.000000E+00 |
| $Y^{**}4$ | 1.579876E−07 |
| $X^{**}5$ | 0.000000E+00 |
| $X^{**}4 * Y$ | 1.789364E−07 |
| $X^{**}3 * Y^{**}2$ | 0.000000E+00 |
| $X^{**}2 * Y^{**}3$ | −2.609879E−07 |
| $X * Y^{**}4$ | 0.000000E+00 |
| $Y^{**}5$ | −6.129549E−10 |
| $X^{**}6$ | −3.316779E−08 |
| $X^{**}5 * Y$ | 0.000000E+00 |
| $X^{**}4 * Y^{**}2$ | 9.498635E−09 |
| $X^{**}3 * Y^{**}3$ | 0.000000E+00 |
| $X^{**}2 * Y^{**}4$ | 9.042084E−09 |
| $X * Y^{**}5$ | 0.000000E+00 |
| $Y^{**}6$ | −4.013470E−10 |
| $X^{**}7$ | 0.000000E+00 |
| $X^{**}6 * Y$ | −8.112755E−10 |
| $X^{**}5 * Y^{**}2$ | 0.000000E+00 |
| $X^{**}4 * Y^{**}3$ | 1.251040E−09 |
| $X^{**}3 * Y^{**}4$ | 0.000000E+00 |
| $X^{**}2 * Y^{**}5$ | −1.505674E−10 |
| $X * Y^{**}6$ | 0.000000E+00 |
| $Y^{**}7$ | −4.419392E−11 |
| $X^{**}8$ | 4.236650E−10 |
| $X^{**}7 * Y$ | 0.000000E+00 |
| $X^{**}6 * Y^{**}2$ | −1.079269E−10 |
| $X^{**}5 * Y^{**}3$ | 0.000000E+00 |
| $X^{**}4 * Y^{**}4$ | −1.678245E−10 |
| $X^{**}3 * Y^{**}5$ | 0.000000E+00 |
| $X^{**}2 * Y^{**}6$ | 2.198604E−12 |
| $X * Y^{**}7$ | 0.000000E+00 |
| $Y^{**}8$ | −2.415118E−12 |
| $X^{**}9$ | 0.000000E+00 |
| $X^{**}8 * Y$ | 4.113054E−12 |
| $X^{**}7 * Y^{**}2$ | 0.000000E+00 |
| $X^{**}6 * Y^{**}3$ | −1.805964E−12 |
| $X^{**}5 * Y^{**}4$ | 0.000000E+00 |
| $X^{**}4 * Y^{**}5$ | 9.480632E−13 |
| $X^{**}3 * Y^{**}6$ | 0.000000E+00 |
| $X^{**}2 * Y^{**}7$ | 2.891726E−13 |
| $X * Y^{**}8$ | 0.000000E+00 |
| $Y^{**}9$ | −2.962804E−14 |
| $X^{**}10$ | −6.030361E−13 |
| $X^{**}9 * Y$ | 0.000000E+00 |
| $X^{**}8 * Y^{**}2$ | −7.368710E−13 |
| $X^{**}7 * Y^{**}3$ | 0.000000E+00 |
| $X^{**}6 * Y^{**}4$ | 9.567750E−13 |
| $X^{**}5 * Y^{**}5$ | 0.000000E+00 |
| $X^{**}4 * Y^{**}6$ | 4.280494E−14 |
| $X^{**}3 * Y^{**}7$ | 0.000000E+00 |
| $X^{**}2 * Y^{**}8$ | −7.143578E−15 |
| $X * Y^{**}9$ | 0.000000E+00 |
| $Y^{**}10$ | 3.858414E−15 |
| N-Radius | 1.000000E+00 |

TABLE 4

Decenter of Surface #2 and #4 of Table 1, relative to Surface #1 of Table 1.

| Y DECENTER | Z DECENTER | ALPHA TILT |
|---|---|---|
| 6.775E+00 | 2.773E+01 | 7.711E+00 |

TABLE 5

Optical surface prescription of Surface #3 of Table 1.

| | |
|---|---|
| Y Radius | −6.744597E+01 |
| Conic Constant | −1.258507E+00 |
| X | 0.000000E+00 |
| Y | 0.000000E+00 |
| X**2 | −1.300207E−03 |
| X * Y | 0.000000E+00 |
| Y**2 | 4.658585E−04 |
| X**3 | 0.000000E+00 |
| X**2 * Y | −1.758475E−05 |
| X Y**2 | 0.000000E+00 |
| Y**3 | −1.684923E−06 |
| X**4 | −1.463720E−06 |
| X**3 * Y | 0.000000E+00 |
| X**2 * Y**2 | −1.108359E−06 |
| X * Y**3 | 0.000000E+00 |
| Y**4 | −1.098749E−07 |
| X**5 | 0.000000E+00 |
| X**4 * Y | −7.146353E−08 |
| X**3 * Y**2 | 0.000000E+00 |
| X**2 * Y**3 | −1.150619E−08 |
| X * Y**4 | 0.000000E+00 |
| Y**5 | 5.911371E−09 |
| X**6 | −5.406591E−10 |
| X**5 * Y | 0.000000E+00 |
| X**4 * Y**2 | −1.767107E−09 |
| X**3 * Y**3 | 0.000000E+00 |
| X**2 * Y**4 | −7.415334E−10 |
| X * Y**5 | 0.000000E+00 |
| Y**6 | −5.442400E−10 |
| X**7 | 0.000000E+00 |
| X**6 * Y | 6.463414E−10 |
| X**5 * Y**2 | 0.000000E+00 |
| X**4 * Y**3 | 1.421597E−10 |
| X**3 * Y**4 | 0.000000E+00 |
| X**2 * Y**5 | −3.464751E−11 |
| X * Y**6 | 0.000000E+00 |
| Y**7 | −8.246179E−12 |
| X**8 | −2.087865E−11 |
| X**7 * Y | 0.000000E+00 |
| X**6 * Y**2 | 2.845323E−11 |
| X**5 * Y**3 | 0.000000E+00 |
| X**4 * Y**4 | −5.043398E−12 |
| X**3 * Y**5 | 0.000000E+00 |
| X**2 * Y**6 | 2.142939E−14 |
| X * Y**7 | 0.000000E+00 |
| Y**8 | 1.607499E−12 |
| X**9 | 0.000000E+00 |
| X**8 * Y | −1.922597E−12 |
| X**7 * Y**2 | 0.000000E+00 |
| X**6 * Y**3 | 1.100072E−13 |
| X**5 * Y**4 | 0.000000E+00 |
| X**4 * Y**5 | −4.806130E−14 |
| X**3 * Y**6 | 0.000000E+00 |
| X**2 * Y**7 | −2.913177E−14 |
| X * Y**8 | 0.000000E+00 |
| Y**9 | 9.703717E−14 |
| X**10 | 2.032150E−13 |
| X**9 * Y | 0.000000E+00 |
| X**8 * Y**2 | −1.037107E−13 |
| X**7 * Y**3 | 0.000000E+00 |
| X**6 * Y**4 | 3.602862E−14 |
| X**5 * Y**5 | 0.000000E+00 |
| X**4 * Y**6 | −8.831469E−15 |
| X**3 * Y**7 | 0.000000E+00 |
| X**2 * Y**8 | 2.178095E−15 |
| X * Y**9 | 0.000000E+00 |

TABLE 5-continued

Optical surface prescription of Surface #3 of Table 1.

| | |
|---|---|
| Y**10 | 1.784074E−15 |
| N-Radius | 1.000000E+00 |

TABLE 6

Decenter of Surface #3 of Table 5 relative to Surface #1 of Table 1.

| Y DECENTER | Z DECENTER | ALPHA TILT |
|---|---|---|
| 1.329E+01 | 4.321E+01 | −8.856E+00 |

TABLE 7

Optical surface prescription of Surface #5 of Table 1.

| | |
|---|---|
| Y Radius | −8.300457E+02 |
| Conic Constant | −9.675799E+00 |
| X | 0.000000E+00 |
| Y | 0.000000E+00 |
| X**2 | −1.798206E−04 |
| X * Y | 0.000000E+00 |
| Y**2 | −2.606383E−03 |
| X**3 | 0.000000E+00 |
| X**2 * Y | −7.767146E−05 |
| X Y**2 | 0.000000E+00 |
| Y**3 | −8.958581E−05 |
| X**4 | 1.978414E−05 |
| X**3 * Y | 0.000000E+00 |
| X**2 * Y**2 | 2.081156E−05 |
| X * Y**3 | 0.000000E+00 |
| Y**4 | −1.073001E−06 |
| X**5 | 0.000000E+00 |
| X**4 * Y | 2.585164E−07 |
| X**3 * Y**2 | 0.000000E+00 |
| X**2 * Y**3 | −2.752516E−06 |
| X * Y**4 | 0.000000E+00 |
| Y**5 | −1.470053E−06 |
| X**6 | −1.116386E−07 |
| X**5 * Y | 0.000000E+00 |
| X**4 * Y**2 | −3.501439E−07 |
| X**3 * Y**3 | 0.000000E+00 |
| X**2 * Y**4 | 1.324057E−07 |
| X * Y**5 | 0.000000E+00 |
| Y**6 | −9.038017E−08 |
| X**7 | 0.000000E+00 |
| X**6 * Y | 3.397174E−10 |
| X**5 * Y**2 | 0.000000E+00 |
| X**4 * Y**3 | −1.873966E−08 |
| X**3 * Y**4 | 0.000000E+00 |
| X**2 * Y**5 | 4.051880E−08 |
| X * Y**6 | 0.000000E+00 |
| Y**7 | −3.973293E−09 |
| X**8 | −1.881791E−10 |
| X**7 * Y | 0.000000E+00 |
| X**6 * Y**2 | 5.519986E−09 |
| X**5 * Y**3 | 0.000000E+00 |
| X**4 * Y**4 | 3.822268E−09 |
| X**3 * Y**5 | 0.000000E+00 |
| X**2 * Y**6 | −3.024448E−09 |
| X * Y**7 | 0.000000E+00 |
| Y**8 | 2.673713E−11 |
| X**9 | 0.000000E+00 |
| X**8 * Y | 1.006915E−10 |
| X**7 * Y**2 | 0.000000E+00 |
| X**6 * Y**3 | −2.945084E−10 |
| X**5 * Y**4 | 0.000000E+00 |
| X**4 * Y**5 | 5.958040E−10 |
| X**3 * Y**6 | 0.000000E+00 |
| X**2 * Y**7 | −3.211903E−10 |
| X * Y**8 | 0.000000E+00 |
| Y**9 | 2.296303E−11 |
| X**10 | 5.221834E−12 |

TABLE 7-continued

Optical surface prescription of Surface #5 of Table 1.

| | |
|---|---|
| X**9 * Y | 0.000000E+00 |
| X**8 * Y**2 | 1.135044E-11 |
| X**7 * Y**3 | 0.000000E+00 |
| X**6 * Y**4 | -1.050621E-10 |
| X**5 * Y**5 | 0.000000E+00 |
| X**4 * Y**6 | 5.624902E-11 |
| X**3 * Y**7 | 0.000000E+00 |
| X**2 * Y**8 | 5.369592E-12 |
| X * Y**9 | 0.000000E+00 |
| Y**10 | 2.497657E-12 |
| N-Radius | 1.000000E+00 |

TABLE 8

Decenter of Surface #5 relative to Surface #1 of Table 1.

| Y DECENTER | Z DECENTER | ALPHA TILT |
|---|---|---|
| .427E+01 | 3.347E+01 | 7.230E+01 |

TABLE 9

Optical surface prescription of Surface #5 of Table 2.

| | |
|---|---|
| Y Radius | -8.779024E+01 |
| Conic Constant | -7.055198E+00 |
| X | 0.000000E+00 |
| Y | 0.000000E+00 |
| X**2 | -3.191225E-03 |
| X * Y | 0.000000E+00 |
| Y**2 | 4.331992E-03 |
| X**3 | 0.000000E+00 |
| X**2 * Y | -9.609025E-05 |
| X Y**2 | 0.000000E+00 |
| Y**3 | -2.432809E-05 |
| X**4 | -2.955089E-06 |
| X**3 * Y | 0.000000E+00 |
| X**2 * Y**2 | 2.096887E-07 |
| X * Y**3 | 0.000000E+00 |
| Y**4 | -9.184356E-07 |
| X**5 | 0.000000E+00 |
| X**4 * Y | 3.707556E-08 |
| X**3 * Y**2 | 0.000000E+00 |
| X**2 * Y**3 | -1.535357E-07 |
| X * Y**4 | 0.000000E+00 |
| Y**5 | -1.445904E-08 |
| X**6 | -4.440851E-09 |
| X**5 * Y | 0.000000E+00 |
| X**4 * Y**2 | 1.686424E-09 |
| X**3 * Y**3 | 0.000000E+00 |
| X**2 * Y**4 | 6.770909E-09 |
| X * Y**5 | 0.000000E+00 |
| Y**6 | -3.713094E-10 |
| X**7 | 0.000000E+00 |
| X**6 * Y | -1.316067E-10 |
| X**5 * Y**2 | 0.000000E+00 |
| X**4 * Y**3 | 7.924387E-10 |
| X**3 * Y**4 | 0.000000E+00 |
| X**2 * Y**5 | -8.011955E-11 |
| X * Y**6 | 0.000000E+00 |
| Y**7 | 3.606142E-11 |
| X**8 | 3.208020E-11 |
| X**7 * Y | 0.000000E+00 |
| X**6 * Y**2 | -2.180416E-11 |
| X**5 * Y**3 | 0.000000E+00 |
| X**4 * Y**4 | -3.616135E-11 |
| X**3 * Y**5 | 0.000000E+00 |
| X**2 * Y**6 | -5.893434E-12 |
| X * Y**7 | 0.000000E+00 |
| Y**8 | 3.081069E-12 |
| X**9 | 0.000000E+00 |
| X**8 * Y | 1.267096E-12 |
| X**7 * Y**2 | 0.000000E+00 |

TABLE 9-continued

Optical surface prescription of Surface #5 of Table 2.

| | |
|---|---|
| X**6 * Y**3 | -1.848104E-12 |
| X**5 * Y**4 | 0.000000E+00 |
| X**4 * Y**5 | 5.208420E-14 |
| X**3 * Y**6 | 0.000000E+00 |
| X**2 * Y**7 | 1.198597E-13 |
| X * Y**8 | 0.000000E+00 |
| Y**9 | -6.834914E-14 |
| X**10 | -1.706677E-14 |
| X**9 * Y | 0.000000E+00 |
| X**8 * Y**2 | -1.614840E-14 |
| X**7 * Y**3 | 0.000000E+00 |
| X**6 * Y**4 | 8.739087E-14 |
| X**5 * Y**5 | 0.000000E+00 |
| X**4 * Y**6 | 3.940903E-15 |
| X**3 * Y**7 | 0.000000E+00 |
| X**2 * Y**8 | 5.435162E-15 |
| X * Y**9 | 0.000000E+00 |
| Y**10 | -2.259169E-15 |
| N-Radius | 1.000000E+00 |

TABLE 10

Decenter of Surface #5 relative to Surface #1 of Table 2.

| Y DECENTER | Z DECENTER | ALPHA TILT |
|---|---|---|
| 3.358E+00 | 4.900E+01 | 6.765E+00 |

As used in the system prescription Tables, e.g., Table 1 or Table 2, the term "XY Poly" refers to a surface which may be represented by the equation $$z = \frac{cr^2}{1+\sqrt{1-(1+k)c^2r^2}} + \sum_{j=2}^{66} C_j x^m y^n \quad j = \frac{(m+n)^2 + m + 3n}{2} + 1,$$

where z is the sag of the free-form surface measured along the z-axis of a local x, y, z coordinate system, c is the vertex curvature (CUY), r is the radial distance, k is the conic constant, and $C_j$ is the coefficient for $x^m y^n$.

Figure 9:
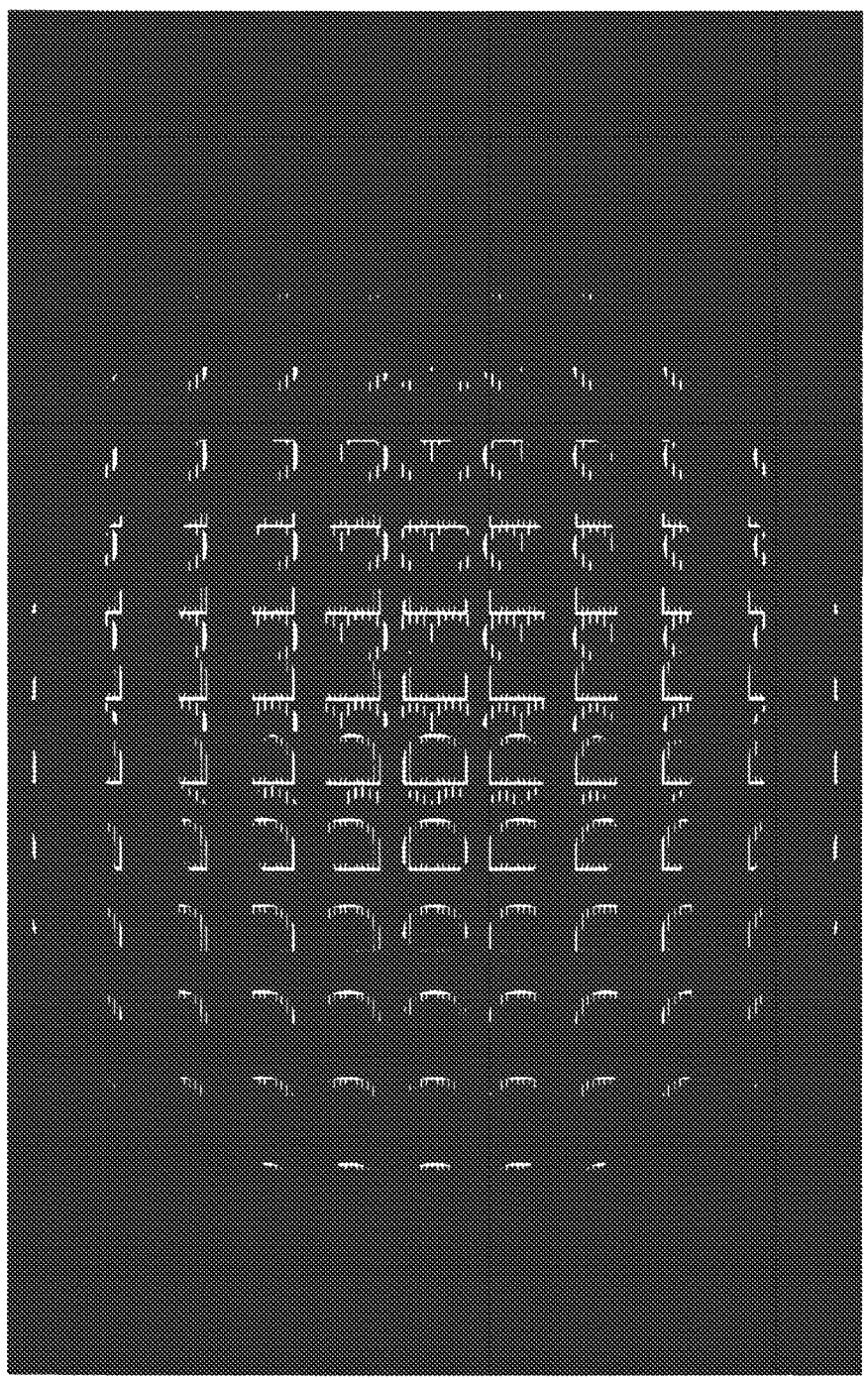
FIG. 9 illustrates the experimental "3D" image used in a particular demonstration of the invention.

For demonstration purposes, a 3D scene including a number "3" and a letter "D" was simulated. In the visual space, the objects "3" and "D" were located ~4 meters and 30 cms away from the eye position, respectively. To clearly demonstrate the effects of focusing, these character objects, instead of using plain solid colors, were rendered with black line textures. An array of 18×11 elemental images of the 3D scene were simulated (FIG. 9), each of which consisted of 102 by 102 color pixels. The 3D scene reconstructed by the micro-InI unit was approximately 10 mm away from the MLA and the separation of the two reconstructed targets was approximately 3.5 mm in depth in the intermediate reconstruction space.

FIGS. 10A through 10D shows a set of images captured with a digital camera placed at the eye position. To demonstrate the effects of focus and see-through view, in the real-world view, a Snellen letter chart and a printed black-white grating target were placed ~4 meters and 30 cm away from the viewer, respectively, which corresponded to the locations of the objects "3" and "D", respectively.

Figure 10A:
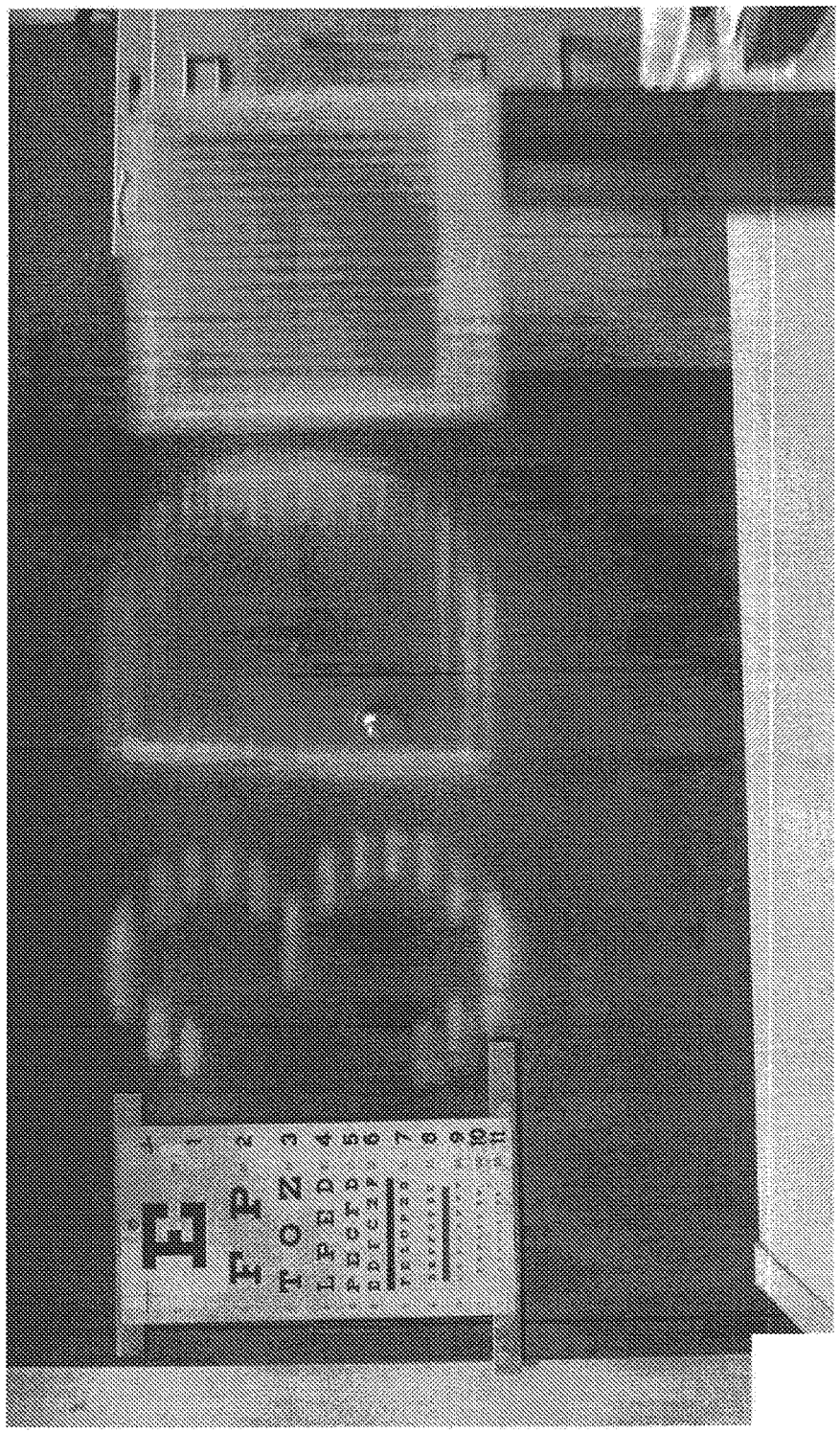
FIGS. 10A to 10D demonstrate images captured by a digital camera placed at the eyepiece of the prototype of FIG. 8 where the camera was focused at 4 m (FIG. 10A), 30 cm (FIG. 10B), shifted to the left side of the exit pupil (FIG. 10C), and shifted to the right side of the exit pupil (FIG. 10D).
Figure 10B:
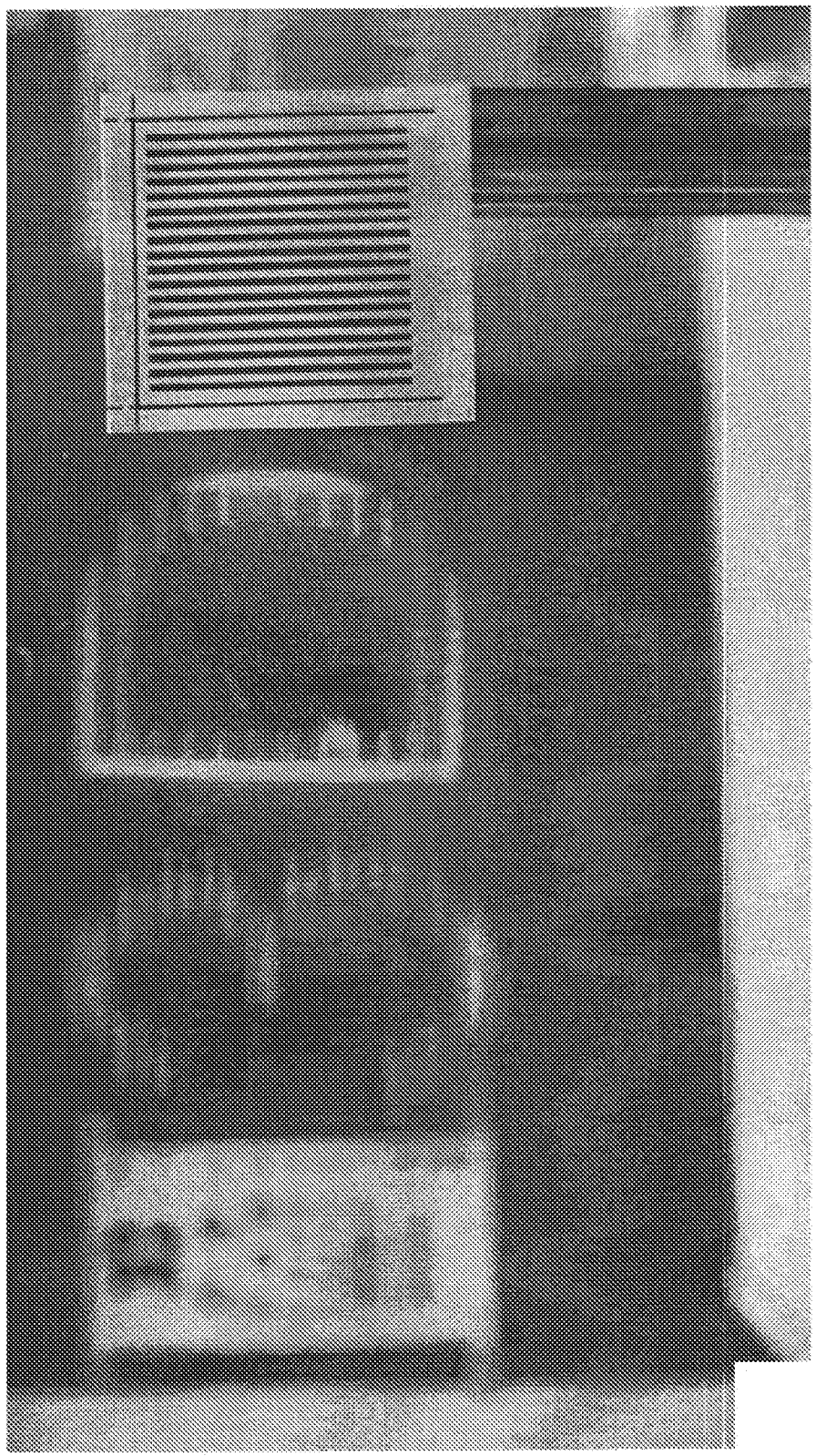
Figure 10C:
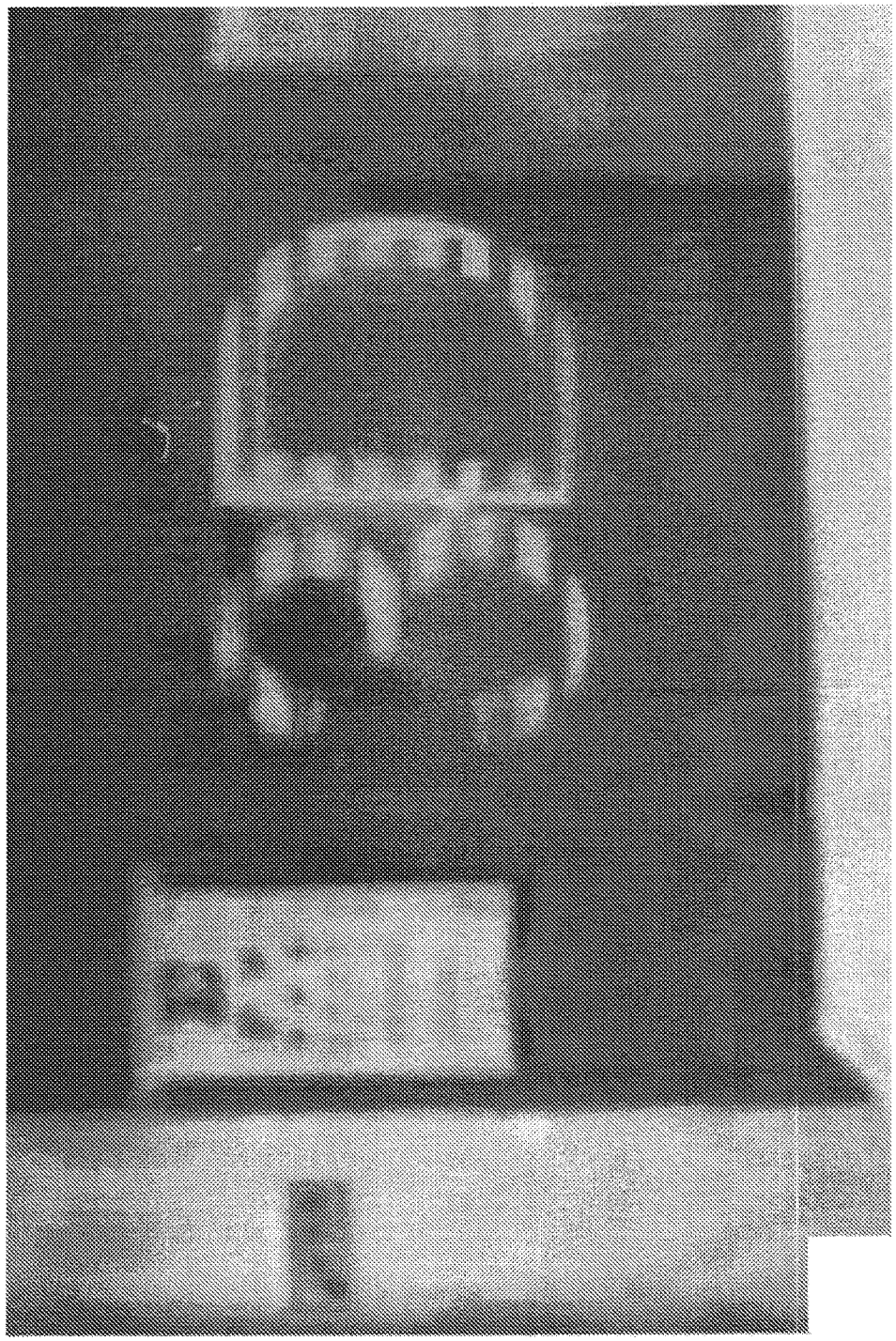
Figure 10D:
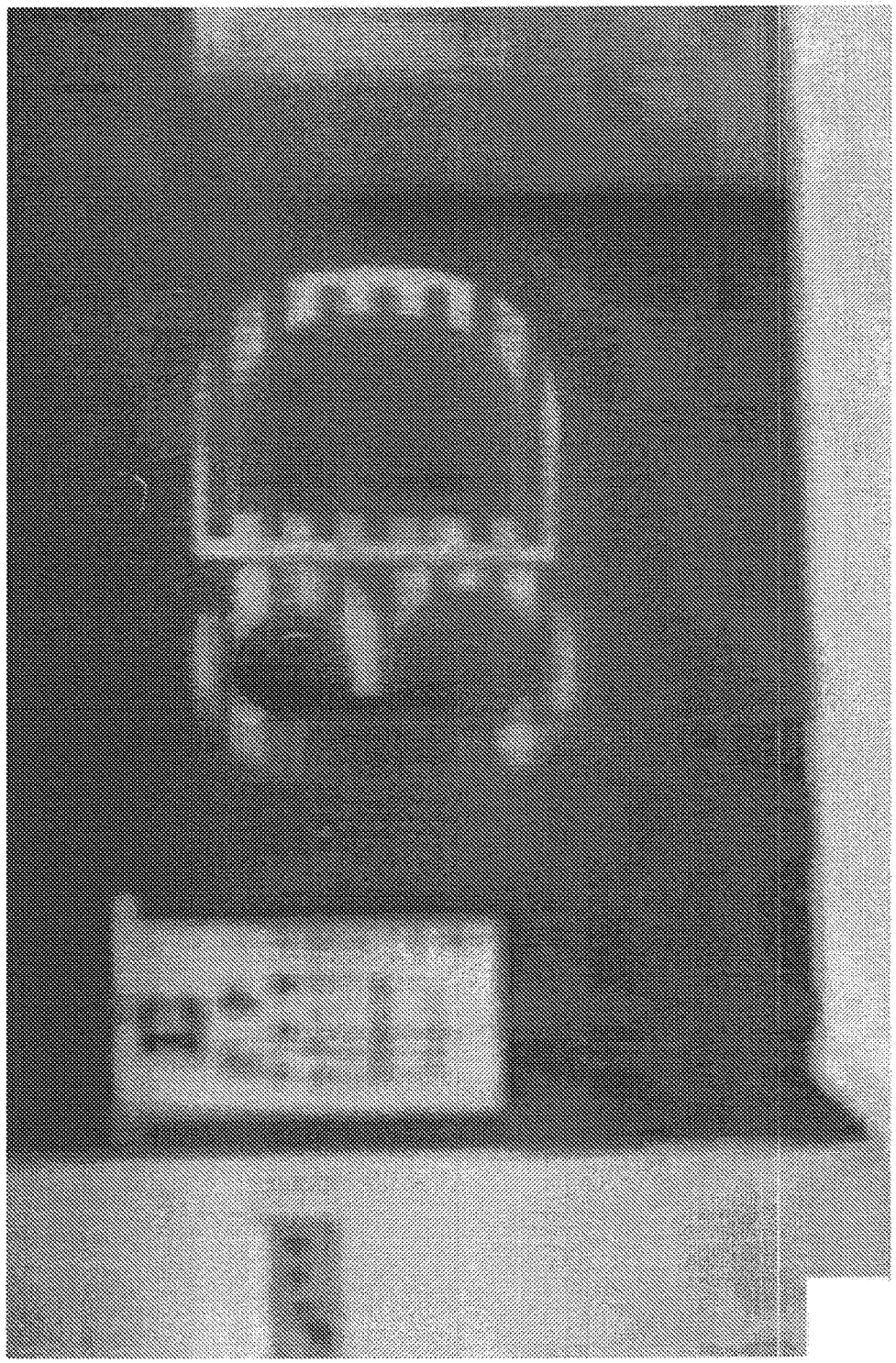

FIGS. 10A and 10B demonstrate the effects of focusing the camera on the Snellen chart and grating target, respectively. The object "3" appeared to be in sharp focus when the camera was focused on the far Snellen chart while the object "D" was in focus when the camera was focused on the near grating target. FIGS. 10C and 10D demonstrate the effects of shifting the camera position from the left to the right sides of the eyebox while the camera focus was set on the near grating target. As expected, slight perspective change was observed between these two views. Although artifacts admittedly are visible and further development is needed, the results clearly demonstrated that the proposed method for AR display can produce correct focus cues and true 3D viewing in a large depth range.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

A number of patent and non-patent publications are cited in the specification, the entire disclosure of each of these publications is incorporated by reference herein.

REFERENCES

[1] Yano, S., Emoto, M., Mitsuhashi, T., and Thwaites, H., "A study of visual fatigue and visual comfort for 3D HDTV/HDTV images," Displays, 23(4), pp. 191-201, 2002.

[2] S. J. Watt, K. Akeley, M. O. Ernst, and M. S. Banks, "Focus Cues Affect Perceived Depth," J. Vision, 5(10), 834-862, (2005).

[3] D. M. Hoffman, A. R. Girshick, K. Akeley, and M. S. Banks, "Vergence-Accommodation Conflicts Hinder Visual Performance and Cause Visual Fatigue," J. Vision, 8(3), 1-30, (2008).

[4] G. Lippmann, "Epreuves reversibles donnant la sensation du relief," Journal of Physics (Paris) 7, 821-825 (1908).

[5] C. B. Burckhardt, "Optimum parameters and resolution limitation of integral photography," J. Opt. Soc. Am. 58, 71-76 (1968).

[6] T. Okoshi, "Optimum design and depth resolution of lens-sheet and projection-type three-dimensional displays," Appl. Opt. 10, 2284-2291 (1971).

[7] F. Okano, H. Hoshino, J. Arai y I. Yuyama, "Real-time pickup method for a three-dimensional image based on integral photography," Appl. Opt. 36, 1598-1603 (1997).

[8] J. Aran, "Depth-control method for integral imaging," Optics Letters, 33(3): 279-282, 2008.

[9] H. Hua, "Sunglass-like displays become a reality with freeform optical technology," SPIE Newsroom, 2012.

[10] H. Hua and C. Gao, A compact, eye-tracked optical see-through head-mounted display, Proc. SPIE 8288, p. 82881F, 2012.

[11] H. Hua, X. Hu, and C. Gao, "A high-resolution optical see-through head-mounted display with eyetracking capability," Optics Express, November 2013.

[12] D. Cheng, Y. Wang, H. Hua, and M. M. Talha, Design of an optical see-through headmounted display with a low f-number and large field of view using a free-form prism, App. Opt. 48 (14), pp. 2655-2668, 2009.

[13] D. Cheng, Y. Wang, H. Hua, and J. Sasian, Design of a wide-angle, lightweight headmounted display using free-form optics tiling, Opt. Lett. 36 (11), pp. 2098-2100, 2011.

[14] A. Okuyama and S. Yamazaki, Optical system and image observing apparatus and image pickup apparatus using it, U.S. Pat. No. 5,706,136, 1998.

[15] S. Yamazaki, K. Inoguchi, Y. Saito, H. Morishima, and N. Taniguchi, Thin widefield-of-view HMD with freeform-surface prism and applications, Proc. SPIE 3639, p. 453, 1999.

[16] A. Jones, I. McDowall, Yamada H., M. Bolas, P. Debevec, Rendering for an Interactive 360° Light Field Display ACM Transactions on Graphics (TOG)—Proceedings of ACM SIGGRAPH 2007, 26(3), 2007.

[17] Tibor Balogh, "The HoloVizio System," Proceedings of SPIE, VO1 6055, 2006.

[18] Y. Takaki, Y. Urano, S. Kashiwada, H. Ando, and K. Nakamura, "Super multi-view winshield display for long-distance image information presentation," Opt. Express, 19, 704-16, 2011.

[19] Blundell, B. G., and Schwarz, A. J., "The classification of volumetric display systems: characteristics and predictability of the image space," IEEE Transaction on Visualization and Computer Graphics, 8(1), pp. 66-75, 2002.

[20] P. A. Blanche, et al, "Holographic three-dimensional telepresence using large-area photorefractive polymer", Nature, 468, 80-83, November 2010.

[21] Rolland, J. P., Kureger, M., and Goon, A., "Multifocal planes head-mounted displays," Applied Optics, 39(19), pp. 3209-14, 2000.

[22] Akeley, K., Watt, S., Girshick, A., and Banks, M., "A stereo display prototype with multiple focal distances," Proc. of SIGGRAPH, pp. 804-813, 2004.

[23] Schowengerdt, B. T., and Seibel, E. J., "True 3-D scanned voxel displays using single or multiple light sources," Journal of SID, 14(2), pp. 135-143, 2006.

[24] S. Liu, H. Hua, D. Cheng, "A Novel Prototype for an Optical See-Through Head-Mounted Display with Addressable Focus Cues," IEEE Transactions on Visualization and Computer Graphics, 16(3), 381-393, (2010).

[25] S. Liu and H. Hua, "A systematic method for designing depth-fused multi-focal plane three-dimensional displays," Opt. Express, 18, 11562-11573, (2010)

[26] X. Hu and H. Hua, "Design and assessment of a depth-fused multi-focal-plane display prototype," Journal of Display Technology, December 2013.

[27] Suyama, S., Ohtsuka, S., Takada, H., Uehira, K., and Sakai, S., "Apparent 3D image perceived from luminance-modulated two 2D images displayed at different depths," Vision Research, 44: 785-793, 2004.

[28] J. Hong, S. Min, and B. Lee, "Integral floating display systems for augmented reality," Applixed Optics, 51(18): 4201-9, 2012.

[29] A. Malmone, and H. Fuchs, "Computational augmented reality eyeglasses," Proc. of ISMAR 2012.

[30] Rolland, J. P., and Hua, H., "Head-mounted display systems," in Encyclopedia of Optical Engineering (Editors: R. Barry Johnson and Ronald G. Driggers), New York, N.Y.: Marcel Dekker, pp. 1-13, 2005.

[31] H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.

[32] www.lumus-optical.com/

[33] www.innovega-inc.com

[34] www.epson.com/cgi-bin/Store/jsp/Moverio/Home.do

[35] www.google.com/glass/start/

[36] M. Martínez-Corral, H. Navarro, R. Martínez-Cuenca, G. Saavedra, and B. Javidi, "Full parallax 3-D TV with programmable display parameters," Opt. Phot. News 22, 50-50 (2011).

[37] J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).

[38] Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.

[39] Xiao Xiao, Bahram Javidi, Manuel Martinez-Corral, and Adrian Stern, "Advances in Three-Dimensional Integral Imaging: Sensing, Display, and Applications," Applied Optics, 52(4): 546-560, 2013.

[40] J. S. Jang, F. Jin, and B. Javidi, "Three-dimensional integral imaging with large depth of focus by use of real and virtual image fields," Opt. Lett. 28:1421-23, 2003.

[41] S. Bagheri and B. Javidi, "Extension of Depth of Field Using Amplitude and Phase Modulation of the Pupil Function," Journal of Optics Letters, vol. 33, no. 7, pp. 757-759, 1 Apr. 2008.

What is claimed is:

1. A 3D augmented reality display, comprising:
a microdisplay for providing a virtual 3D image for display to a user;
variable focus display optics configured to receive optical radiation from the microdisplay and configured to create a 3D lightfield having a 3D volume of the received radiation at a location that may be varied by the variable focus optics; and
an eyepiece in optical communication with the display optics configured to receive the volume of the 3D lightfield the variable focus display optics and configured to create a magnified virtual image of the 3D lightfield having a magnified 3D volume, at a virtual reference plane and configured to deliver the magnified 3D volume of the virtual image to an exit pupil of the augmented reality display.

2. The 3D augmented reality display of claim 1, wherein the variable focus display optics includes a liquid lens.

3. The 3D augmented reality display of claim 1, comprising an imaging device configured to receive information from a scene.

4. A 3D augmented reality display, comprising:
a microdisplay for providing a virtual 3D image for display to a user;
display optics configured to receive optical radiation having a 3D volume of the microdisplay and configured to create a 3D lightfield from the received radiation;
an eyepiece in optical communication with the display optics configured to receive the volume of the 3D lightfield the display optics and configured to create a magnified virtual image of the 3D lightfield having a magnified 3D volume, at a virtual reference plane and configured to deliver the magnified 3D volume of the virtual image to an exit pupil of the augmented reality display; and
an imaging device configured to receive information from a scene.

5. The 3D augmented reality display of claim 3, wherein the imaging device comprises a camera.

6. The 3D imaging augmented reality display claim 3, wherein the imaging device comprises an integral imaging image capture system.

7. The 3D imaging augmented reality display of claim 3, wherein the imaging device comprises a 3D imaging capture system using axially distributed imaging.

8. The 3D augmented reality display of claim 3, wherein the imaging device includes an information capture unit for analyzing the information received by the imaging device to perform object recognition thereon.

9. The 3D augmented reality display of claim 3, wherein the imaging device is disposed in communication with the microdisplay to provide the analysis to the microdisplay.

10. The 3D imaging augmented reality display and object recognition of claim 3, wherein the image capture device includes a variable focal length optics to provide enhanced performance in terms of depth of field.

11. The 3D augmented reality display of claim 3, wherein the display optics comprises integral imaging optics.

12. The 3D augmented reality display of claim 3, wherein the eyepiece comprises a selected surface configured to receive the 3D lightfield the display optics and reflect the received radiation to the exit pupil, the selected surface also configured to receive optical radiation from a source other than the microdisplay and to transmit the optical radiation to the exit pupil.

13. The 3D augmented reality display of claim 3, wherein the eyepiece comprises a freeform prism shape.

14. The 3D augmented reality display of claim 3, wherein the eyepiece comprises a first surface configured to receive and refract optical radiation the display optics and comprises a second surface configured to receive the refracted optical radiation the first surface, the second surface configured to reflect the optical radiation to a third surface of the eyepiece, the third surface configured to reflect the optical radiation reflected the second surface to the exit pupil.

15. The 3D augmented reality display of claim 14, comprising a corrector lens disposed adjacent the second surface of the eyepiece.

16. The 3D augmented reality display of claim 3, wherein one or more of the surfaces of the eyepiece comprise a rotationally asymmetric surface.

17. The 3D augmented reality display of claim 3, wherein the eyepiece comprises a wedge shape.

18. The 3D augmented reality display of claim 3, wherein the eyepiece comprises a surface represented by the equation $$z = \frac{cr^2}{1+\sqrt{1-(1+k)c^2r^2}} + \sum_{j=2}^{66} C_j x^m y^n \quad j = \frac{(m+n)^2 + m + 3n}{2} + 1,$$

where z is the sag of the free-form surface measured along the z-axis of a local x, y, z coordinate system, c is the vertex curvature (CUY), r is the radial distance, k is the conic constant, and $C_j$ is the coefficient for $x^m y^n$.

19. The 3D augmented reality display of claim 3, wherein the display optics comprises one or more of a holographic display, multi-layer computational lightfield display, and a volumetric display.

20. The 3D imaging augmented reality display of claim 3, wherein the 3D lightfield provides full parallax.

21. The 3D augmented reality display of claim 1, wherein the variable focus display optics includes a liquid crystal lens.

22. The 3D augmented reality display of claim 1, wherein the variable focus display optics includes one or more of a membrane mirror and a birefringent lens.

* * * * *

UNITED STATES PATENT AND TRADEMARK OFFICE
CERTIFICATE OF CORRECTION

PATENT NO. : 10,469,833 B2
APPLICATION NO. : 15/122497
DATED : November 5, 2019
INVENTOR(S) : Hong Hua and Bahram Javidi Page 1 of 1

It is certified that error appears in the above-identified patent and that said Letters Patent is hereby corrected as shown below:

In the Claims

Column 19, Claim 1, Line 11, "lightfield the variable" should read --lightfield from the variable--

Column 20, Claim 12, Line 3, "the 3D lightfield the display" should read --the 3D lightfield from the display--

Column 20, Claim 14, Line 3, "optical radiation the display" should read --optical radiation from the display--

Column 20, Claim 14, Line 5, "radiation the first surface" should read --radiation from the first surface--

Column 20, Claim 14, Line 8, "reflected the second surface" should read --reflected from the second surface--

Signed and Sealed this
Sixteenth Day of June, 2020

Andrei Iancu
*Director of the United States Patent and Trademark Office*